(12) United States Patent
Azulai

(10) Patent No.: US 9,369,382 B2
(45) Date of Patent: Jun. 14, 2016

(54) SYSTEM AND METHOD FOR SUPPORTING MESSAGING IN A FULLY DISTRIBUTED SYSTEM

(71) Applicant: Oracle International Corporation, Redwood Shores, CA (US)

(72) Inventor: Sharon Azulai, Rishon Lezion (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 246 days.

(21) Appl. No.: 14/042,084

(22) Filed: Sep. 30, 2013

(65) Prior Publication Data

US 2014/0101333 A1    Apr. 10, 2014

Related U.S. Application Data

(63) Continuation of application No. 11/949,166, filed on Dec. 3, 2007, now Pat. No. 8,549,122.

(60) Provisional application No. 60/868,359, filed on Dec. 4, 2006.

(51) Int. Cl.
| | | |
|---|---|---|
| G06F 15/173 | (2006.01) | |
| H04L 12/721 | (2013.01) | |
| G06F 9/54 | (2006.01) | |
| H04L 29/08 | (2006.01) | |
| H04L 29/06 | (2006.01) | |

(52) U.S. Cl.
CPC ............. *H04L 45/72* (2013.01); *G06F 9/541* (2013.01); *G06F 9/544* (2013.01); *G06F 9/546* (2013.01); *H04L 45/44* (2013.01); *H04L 67/2814* (2013.01); *H04L 67/327* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 5,568,471 A | | 10/1996 | Hershey et al. |
| 5,682,530 A | | 10/1997 | Shimamura |
| 5,802,146 A | * | 9/1998 | Dulman ..................... 379/32.03 |
| 6,104,701 A | * | 8/2000 | Avargues et al. ............. 370/238 |
| 6,148,073 A | * | 11/2000 | Helfand .................... 379/221.01 |
| 6,212,178 B1 | * | 4/2001 | Beck et al. ...................... 370/352 |
| 6,584,093 B1 | * | 6/2003 | Salama et al. ................ 370/351 |
| 6,646,990 B1 | * | 11/2003 | Gray et al. .................... 370/238 |
| 7,016,343 B1 | * | 3/2006 | Mermel et al. ................ 370/356 |
| 7,069,337 B2 | * | 6/2006 | Rawlins et al. ................ 709/238 |
| 7,269,568 B2 | * | 9/2007 | Stiles et al. ........................ 705/5 |
| 7,428,531 B2 | * | 9/2008 | Barron et al. |
| 7,430,594 B2 | | 9/2008 | Krupczak |
| 7,448,022 B1 | * | 11/2008 | Ram et al. ...................... 717/120 |
| 7,561,549 B2 | * | 7/2009 | Meier et al. .................... 370/331 |
| 7,693,071 B2 | * | 4/2010 | Achlioptas et al. ........... 370/238 |
| 2001/0015987 A1 | * | 8/2001 | Wegner et al. ................ 370/503 |
| 2002/0039420 A1 | * | 4/2002 | Shacham et al. ............. 380/277 |
| 2002/0147611 A1 | * | 10/2002 | Greene et al. ...................... 705/1 |
| 2002/0199182 A1 | * | 12/2002 | Whitehead ........................ 725/1 |
| 2004/0034661 A1 | * | 2/2004 | Barron et al. .............. 707/104.1 |

(Continued)

*Primary Examiner* — Ranodhi Serrao
(74) *Attorney, Agent, or Firm* — Tucker Ellis LLP

(57) ABSTRACT

A system and method can support messaging in a fully distributed system. The fully distributed system includes a plurality of agents. An agent in the plurality of agents operates to determine an address for a message, wherein said address is determined at least partially according to a content of the message. Then, said agent can select a path to transmit the message according to said address, and send the message according to said path directly to said address.

18 Claims, 15 Drawing Sheets

(56) References Cited

U.S. PATENT DOCUMENTS

| | | | |
|---|---|---|---|
| 2004/0160941 A1* | 8/2004 | Suh et al. ............... | 370/349 |
| 2005/0114397 A1 | 5/2005 | Doshi et al. | |
| 2005/0220054 A1* | 10/2005 | Meier et al. ............ | 370/331 |
| 2006/0015450 A1* | 1/2006 | Guck et al. ............. | 705/39 |
| 2006/0268722 A1* | 11/2006 | Achlioptas et al. ...... | 370/238 |
| 2006/0268828 A1* | 11/2006 | Yarlagadda ............. | 370/352 |
| 2007/0121596 A1* | 5/2007 | Kurapati et al. ......... | 370/356 |
| 2007/0150480 A1* | 6/2007 | Hwang et al. ........... | 707/10 |
| 2008/0031140 A1* | 2/2008 | Suh et al. ............... | 370/238 |

\* cited by examiner

SYSTEM AND METHOD FOR SUPPORTING MESSAGING IN A FULLY DISTRIBUTED SYSTEM

CLAIM TO PRIORITY

This application is a continuation of U.S. patent application Ser. No. 11/949,166 entitled "SYSTEM AND METHOD FOR COMMUNICATION AGENT WITHIN A FULLY DISTRIBUTED NETWORK" filed Dec. 3, 2007, now as U.S. Pat. No. 8,549,122, which claims the benefit of priority under 35 U.S.C. to U.S. Provisional Patent Application 60/868,359, entitled "DISTRIBUTED NETWORK," by Sharon Azulai, filed on Dec. 4, 2006.

CROSS REFERENCE TO RELATED APPLICATIONS

The following applications are cross-referenced and incorporated herein by reference:
- U.S. patent application Ser. No. 11/949,171 entitled SYSTEM AND METHOD FOR CENTRAL COMPONENT CONSOLE WITHIN A FULLY DISTRIBUTED NETWORK, by Sharon Azulai, filed on Dec. 3, 2007, now abandoned;
- U.S. patent application Ser. No. 11/949,174 entitled METHOD FOR HANDLING COMMUNICATION WITHOUT CENTRALIZED COMPONENT WITHIN A FULLY DISTRIBUTED NETWORK, by Sharon Azulai, filed on Dec. 3, 2007, now abandoned; and
- U.S. patent application Ser. No. 11/949,178 entitled SYSTEM AND METHOD FOR FULLY DISTRIBUTED NETWORK WITH AGENTS, by Sharon Azulai, filed on Dec. 3, 2007, now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is of a system and method for an ESB (Enterprise Service Bus) for a distributed network, and in particular for an ESB having a fully distributed architecture.

BACKGROUND

Organizations, including corporations and other (typically large) entities, need scalable, efficient solutions for network architecture, which enables even remote, distributed components and/or legacy systems to communicate. Small businesses and other small organizations also have such needs, but design paradigms which may be sufficient for smaller entities often fail to work on the significantly larger scale required by large corporations.

One example of such a network architecture is Enterprise Service Buses (ESBs). As described in a white paper by Steve Craggs ("Best-of-Breed ESBs", EAI Industry Consortium, Saint Consulting Limited, 2003), ESBs help to support the latest technologies such as Service Oriented Architectures (SOAs), which provide components and even legacy systems to the network in the form of services. These services should be structured so that they can cooperate and interact without requiring highly specialized human skills and/or specially designed and constructed software. ESBs assist with these interactions, effectively acting as an "enterprise nervous system" (Craggs white paper, quoting the Gartner Group, p. 5) by providing an "IT backbone" (Craggs white paper, p. 6). ESBs are prepackaged and are preferably usable "off the shelf"; however, as described in greater detail below, not all ESBs meet this goal.

According to the above white paper, in order to perform these tasks effectively and return the maximum value to the organization (enterprise), ESBs should have the following features: messaging, transformation, and intelligent routing services, particularly by using XML (extensible mark-up language; described in greater detail below); support for Web services and other types of services, including having a SOA structure; support for distributed components; and such features as manageability, scalability, robustness to failure and so forth (p. 9 of the above white paper).

Messaging may be transmitted through a message architecture concept called MOM (messaging oriented middleware), which is used to support message distribution without a strict orientation to the destination of the message, or connection required to send that message. For example, MOM architectures support content-based routing for messages, in which a message is distributed by topic rather than by an address. It should be noted that such routing currently does not involve actual analysis of the content of the message itself. MOM architectures also support asynchronous message delivery, and the ability of applications (components) in a network to subscribe to messages and to publish messages. All of these facilities should be extended by the ESB architecture, through the use of message brokers. Unfortunately, such message brokers are centralized, and may cause single point of failure and/or bottleneck problems.

MOM is currently being superseded by next generation messaging, which also uses message brokers, but which provides additional functionality to further avoid connection-specific addressing for messages. Unfortunately, this type of technology does not solve the problem of message brokers.

These different architectures typically use (or alternatively may use) XML for messages. XML is a highly standardized language which is easy to parse, transform, analyze and otherwise manipulate. It has a number of disadvantages, however, particularly with regard to the size of the XML messages. Because these messages are comprehensible by humans, and are not binary (machine readable) messages, they tend to be very large. Such large messages in turn place additional stress on currently message system architectures, which rely on one or more centralized brokers. Furthermore, previously designed tools, such as firewalls, cannot always understand or properly handle XML; for example, some known firewalls fail to properly parse and/or block XML messages, even those which are machine to machine communication, because XML messages are different from regular messages.

New tools are therefore required which can handle XML well and which also provide ESB functionality, while avoiding current ESB problems, such as potential single point of failure problems and bottleneck problems caused by the requirement for centralized broker(s). Even the use of more than one such broker simply distributes the problem across more than one point, but does not solve the underlying weakness of a centralized system.

SUMMARY

Described herein are systems and methods that can support messaging in a fully distributed system. The fully distributed system includes a plurality of agents. An agent in the plurality of agents operates to determine an address for a message, wherein said address is determined at least partially according to a content of the message. Then, said agent can select a path to transmit the message according to said address, and send the message according to said path directly to said address.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION

Figure 1:
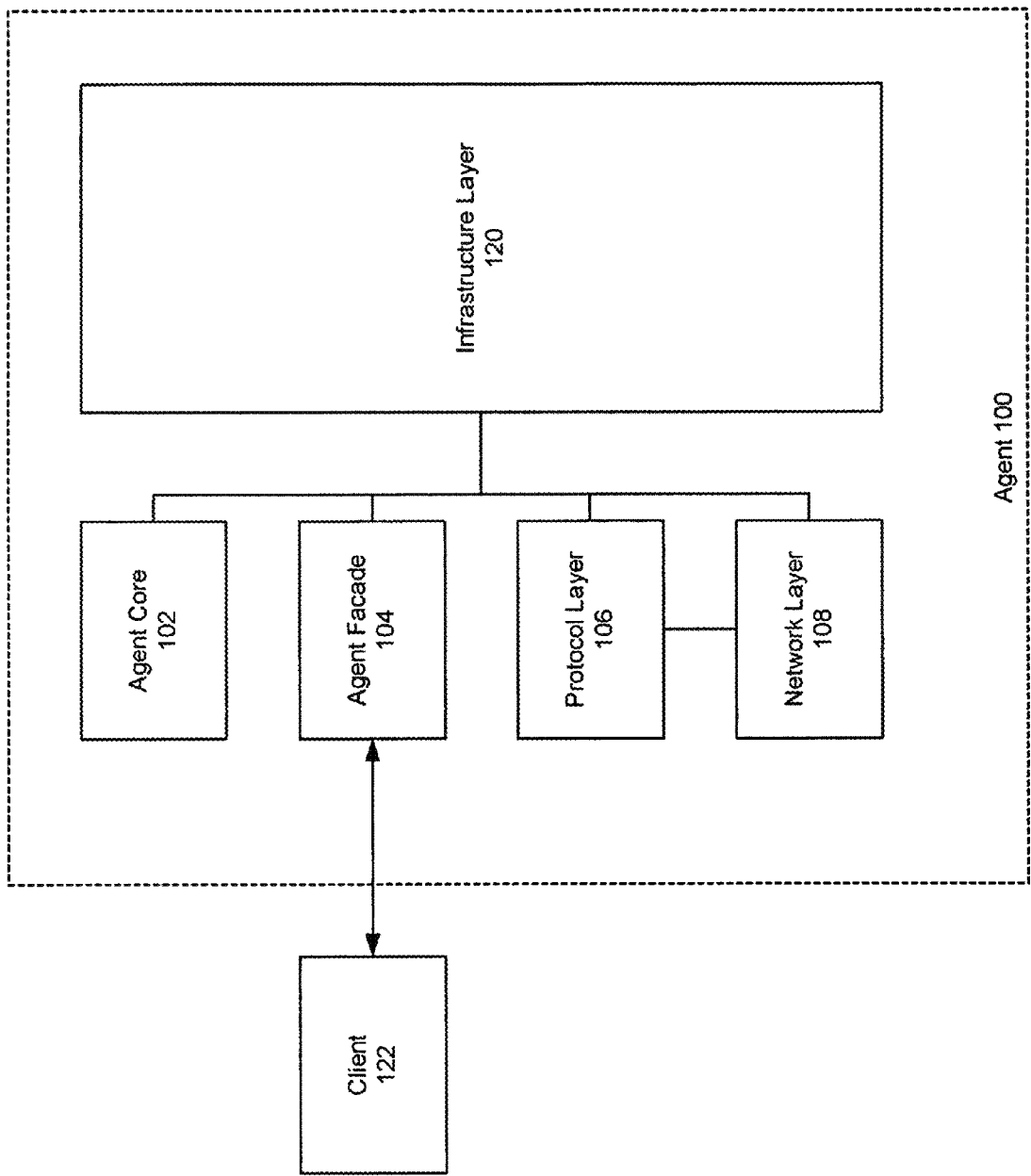
FIG. 1 shows an exemplary agent according to the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The background art does not teach or suggest a system or method for a messaging mechanism which does not require one or more message brokers. The background art also does not teach such a system or method for an ESB which does not have some type of centralized routing component.

The present invention overcomes these disadvantages of the background art by providing a system and method for handling communication in a network without any centralized component(s). The present invention is useful for those networks being implemented according to a service oriented architecture, such as for an ESB (enterprise service bus) for example. The present invention features a fully distributed service bus, unlike background art networks, which rely upon some type of centralization function for messages, such that a plurality of components in the network rely upon communication through a centralized message broker. Such centralized message brokers represent a potential single (or at least concentrated) point of failure and also a potential bottleneck, even if a plurality of such brokers is available in the network. By contrast, the completely distributed nature of the present invention prevents such single or concentrated point of failures, as well as preventing potential bottlenecks for message transmission. Furthermore, such architecture provides potentially unlimited scalability.

Optionally and preferably, messages are in XML (extensible mark-up language) for preferred embodiments of the present invention. Also optionally and preferably, different types of message protocols may optionally be used, including but not limited to, JMS, HTTP, TCP messages, RMI (remote method invocation, which is a Java technology and is used for one object on a JVM (Java virtual machine) to call a method on another object on another JVM). Any other suitable type of message protocol may also optionally be used.

According to another optional embodiment of the present invention, there is provided a smart publish/subscribe function, which more easily enables agents to provide information related to published information and/or to information to which the agent wishes to subscribe. As described in greater detail below, optionally and preferably fully distributed queues may be provided in order to assist in publication of information and rapid distribution to subscribers. The distributed queue is preferably distributed between a plurality of agents, for example if there are several agents publishing the same "topic" or queued material, such as the same XML message and/or portions of the same XML message. The distributed queue may also optionally occur if the same information is included in a plurality of different messages, in which case the recurring information is preferably available from any queue of agent publishing a message containing that recurring information. Optionally and preferably, the agents may communicate between themselves to avoid replicating information between queues.

According to other preferred embodiments of the present invention, there is preferably provided discovery of agents and their capabilities by an agent, which is more preferably automatic. Such automatic discovery may optionally and preferably occur upon initialization of agent and/or re-initialization after failure of the agent. The agent preferably provides information to other agent(s) in the domain(s) of that agent, for example optionally through reliable multicast, concerning the agent's capabilities, information to be published by the agent and/or information to which the agent wishes to subscribe. In addition, the agent preferably receives a map concerning such information about the other agent(s) in the domain, more preferably from the central management console. This map enables the agent to discover such information about the other agent(s) in the domain in an automated manner, thereby preferably updating the world model of the agent(s).

The present invention preferably provides automatic discovery and easy installation for adding a new agent, which is more preferably performed as an "on the fly" operation. Such an "on the fly" operation is also preferably provided for installing new clients etc. According to preferred embodiments of the present invention, it is not necessary to shut down the network and/or to have no down time for the network for such installation.

According to still another embodiment of the present invention, there is provided the capability of flexible connections between agents, such that an agent may optionally and preferably choose the type of connection to another agent or agents for transmitting information. More preferably such a connection is selected according to at least one of a cost function, availability of the connection or scale (of the connection and/or transmission(s)). Examples of such connections include but are not limited to, connections such as TCP, UDP, RUDP (reliable UDP), broadcast, multicast, reliable multicast, tunneling and unicast, and others. The connection may optionally be permanent or non-permanent.

According to another preferred embodiment of the present invention, there is provided a fully distributed network for providing a passive service as an active service by adding push capabilities to the service. For example, the use of a fully distributed network enables Web services, which are usually passive and which usually do not use push capabilities, to be provided as active services with push capabilities. As a non-limiting example, an agent may optionally communicate with the Web service on a regular and/or periodic basis to receive information, and may then optionally publish the received information, thereby pushing the received information. Preferably, the agent communicates with the Web service frequently, for example on the order of seconds.

According to preferred embodiments of the present invention, the fully distributed network is also able to perform synchronization of tasks across the distributed components, without requiring a central message broker or any type of centralized functionality. Instead, synchronization is preferably performed by communication between agents, for example with regard to a distributed queue of messages as described in greater detail below.

The present invention optionally and preferably features a plurality of different types of agents. Non-limiting examples of these agents include an agent as described below with regard to the Figures, also referred to as a "peer agent" or "normal agent"; a proxy agent; and a relay agent. A proxy agent carries some of the processing load of a peer agent. The processing load may optionally include such tasks as validation, parsing, transformation, template matching etc.

A relay agent preferably acts as a kind of a bridge between two agents. A relay agent is used in cases where a direct connection between the two agents is not possible. For example, one agent may be located inside the MZ (militarized or secure zone) and while another agent may be located on the Internet. The relay agent is then preferably located in the DMZ (de-militarized zone) and facilitates bridging between both agents.

According to preferred embodiments, the present invention enables an agent to perform true content-based switching. Such switching (which also includes the functionality of routing) has a number of advantages; for example, it enables other agents to request data according to its content, such as a topic for some messaging protocols such as XML or JMS for example. It also supports publication of data by content, and avoids the pitfalls of mismatched and/or incomplete categories when data is published.

XML is an example of a useful language for such a message, because it allows data to be separated into a plurality of elements, for example according to a template. However, any other language may optionally be used, alone or in combination, if the data can be parsed for determining subscription to the data.

The switching process according to the present invention also preferably enables the determination of the transport mechanism according to which the message should be sent, including but not limited to, unicast, multicast, or broadcast for example, and/or such persistent connections as TCP and/or RUDP (reliable UDP) for example. Preferably, the present invention is able to select which transport mechanism is used, and more preferably also to drop, reconnect and/or swap connections, most preferably according to a cost function. These features have not yet been included in an agent-based switching system which does not use a central message broker of any type; instead currently available background systems use such a central message broker. The present invention therefore provides truly distributed switching.

The principles and operation of the present invention may be better understood with reference to the drawings and the accompanying description.

Referring now to the drawings, FIG. 1 shows an exemplary agent architecture according to the present invention. As shown, an agent 100 preferably features an agent core 102 (shown in more detail with regard to FIG. 2) with an agent façade 104. Agent façade 104 preferably features an open API (application programming interface) which exposes methods and information to clients and/or to other applications in the system (shown as a client 122, communicating with agent 100 through agent façade 104). Agent façade 104 enables agent 100 to communicate with these other applications in the system without predetermined programming for each such application.

Agent core 102 preferably features the internal functions and processes which enable a plurality of agents 100 to operate without any type of message broker for communication across a network.

Agent 100 preferably also features a protocol layer 106 and a network layer 108. Network layer 108 handles communication with one or more other agents 100 with which agent 100 is in communication (not shown); the presence of network layer 108 preferably enables agent 100 to communicate with the other agents, regardless of network architecture and/or the type of network or network protocols being used. Network layer 108 also preferably supports switching and routing functions and other functions for transmitting and/or receiving messages by agent 100 through the network. Protocol layer 106 preferably handles objects used for the operation of the present invention, including performing marshalling and unmarshalling of messages related to the present invention through network layer 108. Messages are analyzed according to content, such as a topic for example, in order to determine where the message should be transmitted, while network layer 108 preferably handles the actual transport but is not concerned with the content of the message.

General services are preferably provided by an infrastructure layer 120, which as shown may optionally provide one or more services to each component of agent 100. Infrastructure layer 120 is described in greater detail below with regard to FIG. 3.

Figure 2A:
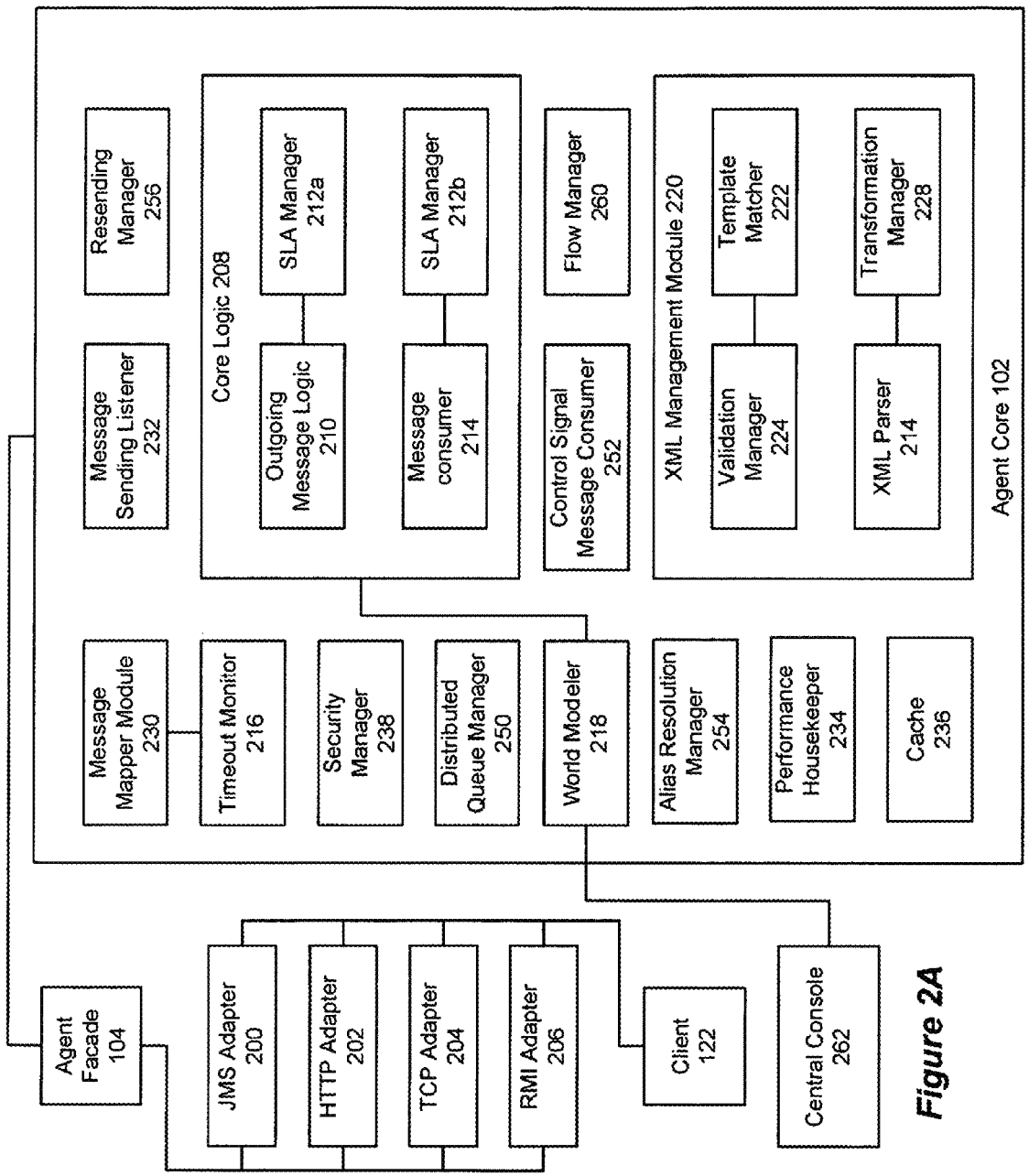
FIG. 2A shows the agent core of FIG. 1 in more detail in an exemplary configuration according to the present invention.

FIG. 2A shows the agent core of FIG. 1 in more detail in an exemplary configuration according to the present invention. As shown, agent core 102 preferably features façade 104 again, shown now to the left for the purposes of clarity only and without any intention of being limiting. To increase the functionality of agent core 102 and to enable agent core 102 to communicate according to different protocols, optionally and preferably one or more adaptors may be provided. For the purposes of explanation only and without any intention of being limiting, the following adaptors are shown: a JMS adaptor 200, an HTTP adaptor 202, a TCP adaptor 204 and a RMI adaptor 206 (Remote Method Invocation). JMS adaptor 200 supports communication according to the JMS (Java messaging service) protocol, which may optionally be used to support asynchronous communication between applications. HTTP adaptor 202 supports communication according to HTTP, which may optionally be used for communicating with Web servers and/or other servers that use HTTP, for example for Web services communication. These adaptors change Web services from passive to active, since agent 100 can repeatedly and periodically query client 122 (such a query could optionally be made for example every 10 seconds) to request information, which could then be published. This publication provides an active service to client 122, as information is published optionally and preferably before a request is made by client 122. This type of function may optionally be used for a client of any type of services, in addition to or in alternative to Web services. TCP adaptor 204 is useful for sending messages according to TCP. These adaptors communicate with client 122 so the agents do not need to communicate with client 122 on the network (not shown). Façade 140 is the API of agent 100 for communication with client 122.

Agent core 102 also preferably features a core logic 208, including those components required for the internal functioning and logic of the agent. Core logic 208 preferably features an outgoing message logic 210 for messages to be sent from the agent, and a message consumer 214 for incoming messages to the agent. Each of outgoing message logic 210 and message consumer 214 preferably features a SLA (service level assurance) manager 212, which handles the determination and maintenance of service levels Outgoing message logic 210 is the entry point for messages which are to be sent from the agent. SLA manager 212 preferably prioritizes message handling according to a priority model, for determining which messages should be sent first. The message model is preferably based on the actual message priority and the sending service priority, more preferably through the use of a priority function (for example, the message and sending service priorities could optionally be multiplied). Message handling may optionally include validation, template matching, message transformation etc.

A flow manager 260 preferably manages the flow of message handling itself. Flow manager 260 preferably features a plurality of processing modules, termed herein processors, each of which is responsible for an atomic action. Optionally, each core function has a separate associated processor, such as a validation processor, a template matching processor and a transformation processor (not shown), each of which may optionally be located at the respective manager but which are preferably called by flow manager 260, more preferably sequentially to handle a particular message. Each such processor is preferably registered at flow manager 260. A processing flow may optionally include the following stages:

a. Validate
   b. Transform
   c. Template matcher

Therefore the message is preferably first validated, after which the message is run through the transformation processor, followed by the template matcher.

Messages are preferably received and processed by message consumer 214. Message consumer 214 receives client messages from protocol layer 106 and preferably acts upon them by invoking core logic 208. As previously described, message consumer 214 also contains a (preferably separate) SLA manager 212 also for prioritizing message handling (for example message acceptance) according to some priority model, as previously described. A similar priority function may also optionally be used.

A distributed queue manager 250 is optionally and preferably provided for managing messages and/or information (optionally including portions of messages) that are distributed between a plurality of agents 100. Distributed queue manager 250 preferably assists with such issues as the order in which a plurality of messages is sent. Background art publish/subscribe message systems rely upon a central message broker, which can therefore perform the necessary synchronization tasks between messages sent from different parts of the system at different types. By contrast, the present invention is fully distributed, such that no central mechanism, such as a broker, exists to perform such synchronization. Instead, preferably distributed queue manager 250 performs such synchronization, for example by enabling higher priority messages to move forward in the queue before lower priority messages. Queue management may also optionally include managing the order of persistent vs. non-persistent messages, and also preferably ensuring that the order in which messages are sent is not the only controlling factor for the queue order.

Distributed queue manager 250 preferably also handles the queue to maintain order of messages sent by a particular agent 100, such that for example a plurality of messages sent by a particular agent 100 is preferably read in the order of being sent.

Figure 2B:
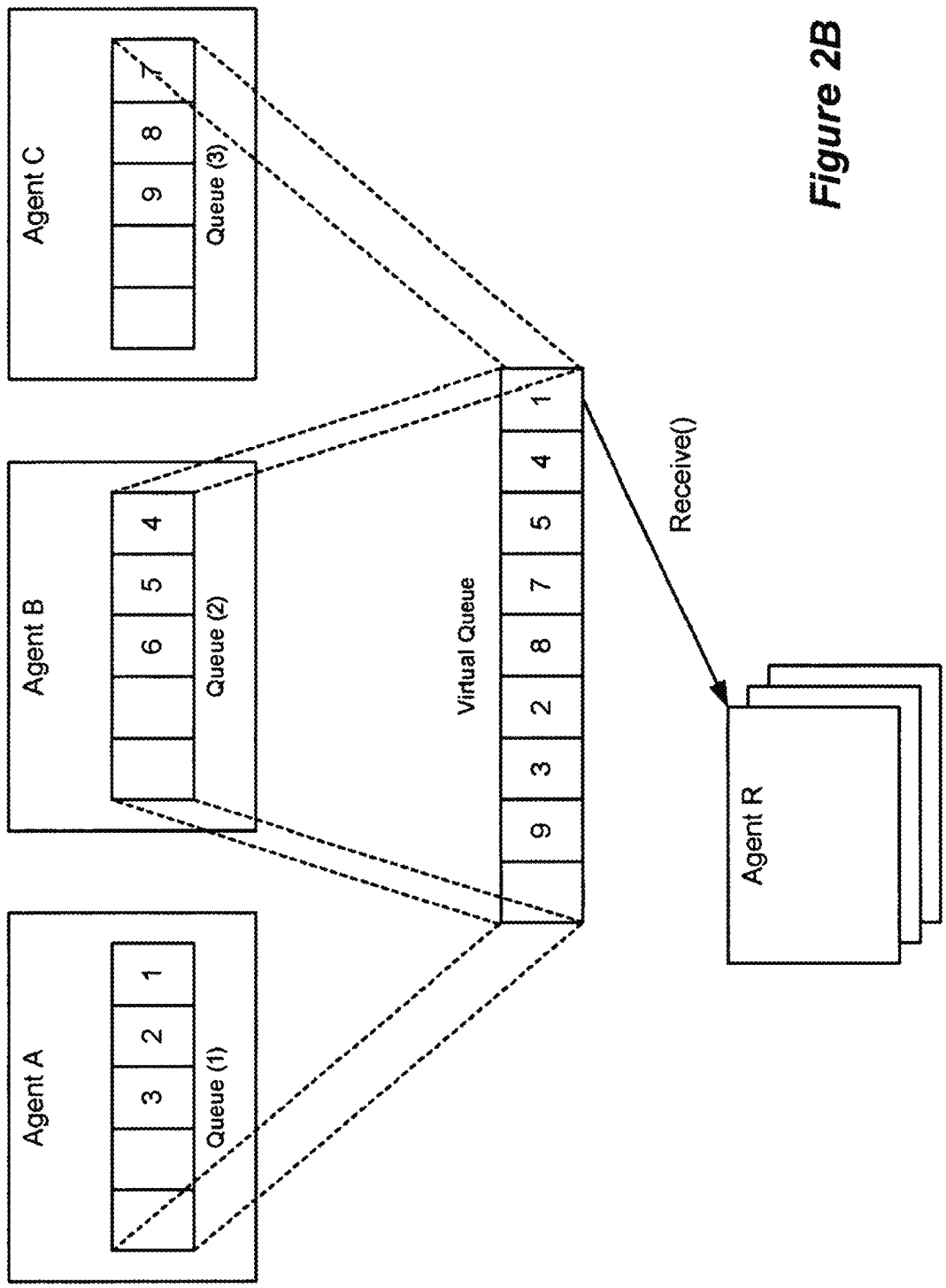
FIG. 2B shows a non-limiting example of a distributed queue according to the present invention.
Figure 2C:
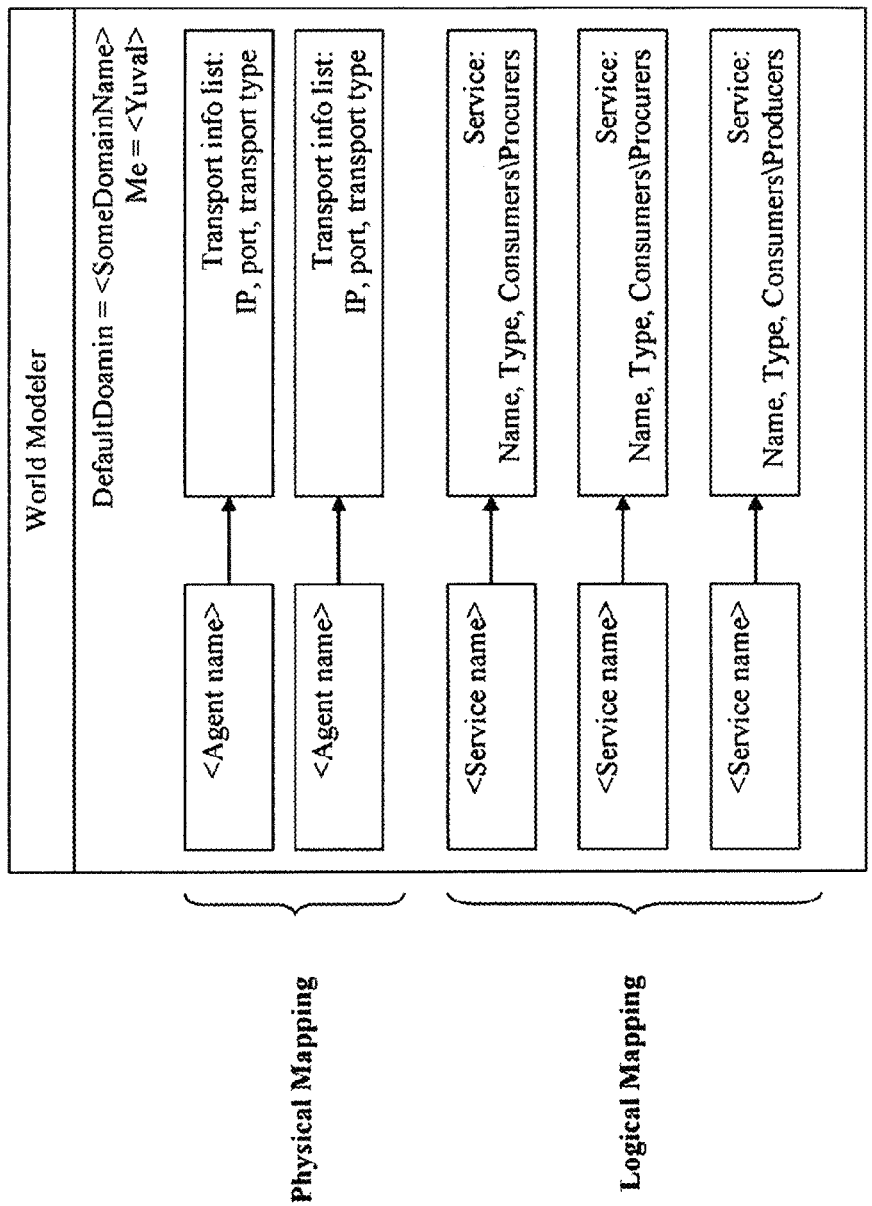
FIG. 2C shows a non-limiting example of a map in world modeler according to the present invention.

FIG. 2B shows a non-limiting example of a distributed queue. Each of three agents (labeled A, B, C) preferably has a queue (1, 2 and 3 respectively) of messages that are sent to receiving agent R. Distributed queue manager 250 at each agent preferably communicates with distributed queue manager 250 at the other agents, such that each agent optionally perceives a virtual queue as shown in terms of message order. For example if Agent A sends messages M1, M2 and M3; Agent B sends messages M4, M5 and M6; and Agent C sends messages M7, M8 and M9, then the messages are preferably maintained in the virtual queue according to the order sent.

Distributed queue manager 250 at each receiving agent optionally manages a separate queue in the name of each sending agent; each such local queue then preferably maintains an internal order of outgoing messages. Receiving agent R then preferably retrieves messages in the order sent within a local queue. A simple de-queuing algorithm may therefore optionally be implemented as a "round robin" algorithm, in which each queue is traversed in turn.

Optionally and more preferably, there is a plurality of different messages, including but not limited to: client messages, management messages and control messages. Client messages preferably pass through the agent to the client (122). These messages are handled through agent 100 for example for translation between different protocols (TCP vs. HTTP for example), in order for inter-operability to be present between the clients. Management messages are messages which originate from a human administrator and are preferably used to remotely manipulate the agent. These messages are preferably forwarded to the Coridan Management Component (CMC) (see FIGS. 3 and 4) for handling.

Control messages originate from an application, such as another agent in the network (not shown); the control messages are then preferably passed to a control signal message consumer 252, which preferably receives control messages from the protocol layer and acts upon them by invoking core logic 208.

Message handling is optionally and preferably further assisted by a timeout monitor 216, which determines when a message is too old to be relevant. When sending a message with an acknowledgment policy, the message is preferably stored in a message mapper module 230. Messages which are stored in message mapper module 230 are preferably either removed from it when a related ACK (acknowledgment) message is received by the agent (normal removal) or alternatively when a certain amount of time has passed, in which case the message can be thought of as an "expired message".

Message mapper module 230 is preferably a persistent map, although persistency is optionally configurable. Message mapper module 230 preferably maintains a mapping between a message ID and the actual message. Message mapper module 230 preferably participates in various messages sending processes. For example, during the message sending process the agent adds the message to the map. At a later stage when an ACK message arrives, the agent uses the correlation ID to remove the persistent message from the map.

The first stage of the sending message flow preferably stores the messages which are about to be processed in the message mapper. Only after the messages are added to message mapper module 230, the agent's flow commences.

Optionally, adding a message to message mapper module 230 does not automatically make it persistent. More preferably, only messages requiring an acknowledgement (ACK) are included in message mapper module 230.

Timeout monitor 216 preferably contains a separate thread which examines the collection of sent messages which have not received any acknowledgment. When timeout monitor 216 locates a message which has not received any acknowledgment, it checks the message "valid until" value. Timeout monitor 216 preferably resends messages which are still valid; timeout monitor 216 tries to resend the message as long as the message is valid. When timeout monitor 216 determines that a message is no longer valid, the message is removed from message mapper module 230. The client which created the message is preferably informed of the message expiration.

A message sending listener 232 is optionally and more preferably responsible for handling "message sending callbacks" which originate from either protocol layer 106 or network layer 108. Both layers preferably call back message sending listener 232 upon sending the message. Events can optionally range from a "successful sending event" to an "error event". It is the responsibility of message sending listener 232 to inspect the event and act based on the information stored in the event. Successfully sending preferably causes message sending listener 232 to remove the sent message from message mapper module 230.

Unsuccessfully sending the message may optionally cause message sending listener 232 to resend the message. The decision to resend the message is preferably delegated to a resending manager 256).

Resending manager 256 preferably decides whether a message should be resent based on one or more criteria, including but not limited to:

a. NumberOfRetries—the number of times the resending thread tries to resend this message; each retry lowers (decrements) this number by 1. If the NumberOfRetries value is 0 than the resending thread preferably discards this message.

b. Valid until—a value for the length of time for which this message is valid; if the valid until time is less than the current time than the resending thread discards this message.

If a message is to be sent, resending manager 256 preferably delays the resending of the message by a configurable amount of time. If the message was sent as a "blocking send", such that the message is not expected to return until an ACK is received for this message, resending manager 256 optionally returns the message. Otherwise, preferably an error message is returned.

A world modeler 218 is preferably featured for enabling core logic 208 to be able to determine how to address messages, for example in order to determine which agent(s) should receive a message. World modeler 218 preferably includes information about other agents which are part of the agent's "world" or domain, and to which data needs to be transmitted in the form of messages. A domain is a group of agents with which a particular agent may communicate. As described in greater detail below, such information may optionally include the identity of one or more agents which have requested particular information through subscribing to data and/or to an event, as well as those agent(s) which are visible to a particular agent, for example for sending a multicast message.

Briefly, publishing data and subscribing to such publications are well known for MOM architectures in general, as they enable data to be passed without connection-specific addressing. For example, according to the background art, which requires a central message broker (unlike the present invention), a first component would publish data about a particular topic by sending it to a queue on the central message broker; one or more other components in the network would inform the central message broker that they wish to subscribe to such a topic, such that the broker would send the subscribing component(s) the data when received from the publishing component.

The present invention also preferably supplies such publication/subscription functionality but without the central message broker. Instead, a list of all agents subscribing to particular data, which are also within the domain or "world" of the agent, is preferably contained in the map in world modeler 218. A non-limiting example of such a map is as in FIG. 2C.

World modeler 218 also enables a central console (not shown; see FIG. 4) to more easily control message transmission between agents without requiring all (or even any) messages to pass through such a console; instead, a human administrator is preferably able to determine how groups of agents interact by sending updates of the map for each agent from the central console. World modeler 218 receives this map and uses it to determine interactions with other agents. Optionally and more preferably, world modeler 218 may receive information about other agents through a discovery mechanism, such that the map is more preferably capable of also being updated through this mechanism and not only through a central console. Most preferably, the discovery mechanism features automatic discovery. Discovery preferably includes determining information about other agents that are available for communication with the particular agent, more preferably by being in the same domain, as well as the characteristics and/or capabilities of these other agents. Most preferably, discovery also involves determining information published by these agents.

The map contained in world modeler 218 may also optionally include information about one or more applications/services connected to each agent (as previously described, the present invention may optionally be implemented with a service oriented architecture, in which application functionality is provided through services, such as Web services for example); the networking capabilities of each agent; and also the identity of one or more adaptors which may also optionally be connected to the agent.

The discovery mechanism which may optionally be used to update this map preferably includes one or more functions which are performed in order for the agent to be able to request information. For example, preferably the agent is able to transmit a message which requests the identity of a publisher of particular data. More preferably, the data does not need to necessarily be organized by category; instead, the agent may optionally and more preferably request particular data and/or notification of an event more generally, without being limited to specific categories. Each such publisher agent which receives the request preferably then responds with a notification message. The requesting agent then preferably adds the information to the map in world modeler 218.

A sample entry in such a map may optionally appear as follows:
<Agent Name><Agent Address><Agent Capabilities>

An alias resolution manager 254 is a mapping module that preferably maps a name to another name. It may optionally be present at more than one component of agent core 120.

An XML management module 220 preferably handles the tasks related to XML itself. XML management module 220 is for an optional but preferred embodiment of the present invention, in which messages are prepared in XML. XML management module 220 preferably features validation manager 224 and template matcher 222, as previously described; XML management module 220 more preferably also features a XML parser 226 and a transformation manager 228.

Validation manager 224 preferably validates any messages the client wishes to send according to a predefined DTD (document type definition), which supports automatic validation to determine whether a document follows the DTD. In cases of validation failure, validation manager 224 preferably acts according to one or more of the following illustrative, non-limiting rules:
 a. No validation
 b. Alert only
 c. Alert and discarded message
 d. discarded message The agent's configuration preferably determines whether validation manager 224 is active, for example for always checking messages. The validation information is preferably stored in memory and is more preferably not persistent, such that if the agent fails, all validation information would need to be rebuilt by the client.

Validation manager 224 is preferably a pluggable module, allowing it to be replaced at a later date. The validation process is optionally and preferably determined at least partially according to information and/or instructions received from the central control.

Template matcher 222 preferably features at least one template, and more preferably a plurality of templates according to which a message may be parsed. The message is optionally and preferably in XML, such that the template is optionally and preferably constructed for parsing XML. These XML templates may range from full XML DTDs to specific XPath filters. XPath is an XML parser, which is able to understand and parse XML for example optionally according to the hierarchy of the XML document as well as optionally according to a search key. A message may come from a particular client, which may have subscribed to the message data or content, as described in greater detail below. Xpath is optionally and preferably used in order to match messages to clients.

Xpath is a non-XML language that may optionally be used to identify particular parts of XML documents. Xpath permits expressions to be written that refer to the document's first person element (as a non-limiting example of an element), the seventh child element of the third person element, the ID attribute (as a non-limiting example of an attribute) of the first person element whose contents are the string "Fred Jones" (as a non-limiting example), all xml-stylesheet processing instructions in the document's prolog, and so forth. Xpath indicates nodes by position, relative position, type, content, and several other criteria. Xpath expressions can also represent numbers, strings, or Booleans.

Template matcher 222 is preferably used to map templates, such as XML templates, to clients. When a client publishes a XML message (or other type of message), XML parser 226 parses the message, and uses template matcher 222 to locate any clients which were subscribed to a message having the particular template. The sending agent then sends the message only to these clients.

The receiving agent preferably performs the following process for message filtering. For example, if an agent was subscribed to receive all documents having a particular key value (e.g. a particular element or elements having particular value(s)), the filtering process may optionally be performed to determine whether a message has an element with a particular value.

According to preferred embodiments of the present invention, if a failure occurs when sending a message to an agent, template matcher 222 preferably removes "dead" (non-responding) agents from the map stored in world modeler 218 according to the topic and/or agent durability. Subscribers (subscribing agents) to durable topics are preferably not removed from template matcher 222 even if the sending agent knows that the receiving agent is dead. If on the other hand the subscriber of the topic is not a durable subscriber, the sending agent preferably removes the "dead" receiving agent from template matcher 222. Optionally and preferably, template matcher 222 is not persistent.

The template matcher entries are preferably removed from the map according to their TTL (time to live).

According to other preferred embodiments of the present invention, during the agent initialization stage, the agent preferably sends control messages to other agents in the agent's domain. These control messages preferably contain one or more templates, more preferably XML templates, for which the agent expects to receive message(s). This information is then stored in template matcher 222 of each receiving agent. Template matcher 222 is optionally only used for publication/subscription processes.

Transformation manager 228 is preferably able to transform one type of XML message into another type, optionally and more preferably according to XSLT. The central console optionally allows the human administrator to add new XML transformations which enable the XSLT to perform different types of transformations.

A performance housekeeper 234 optionally and preferably monitors various metrics with regard to agent functions. Performance housekeeper 234 also preferably maintains a performance policy which is responsible for calculating the agent's overall metric. These metrics may optionally be used to affect decisions taken by the agent itself or the administrator of the system (while using the configuration manager to view these metrics).

Metric measurement is preferably performed by adding new objects which implement the measure( ) interface.

Performance housekeeper 234 is able to detect new measurement objects and activate them. The human administrator is preferably able to use the central console 262 in order to load/unload measurement objects. Some illustrative examples of such measurements may include but are not limited to the list in Appendix A.

Message sending listener 232 optionally and preferably informs performance housekeeper 234 about various statistics such as number of failed/successful sending attempts.

Other optional components of agent core 120 include but are not limited to a cache 236 and a security manager 238.

Figure 3A:
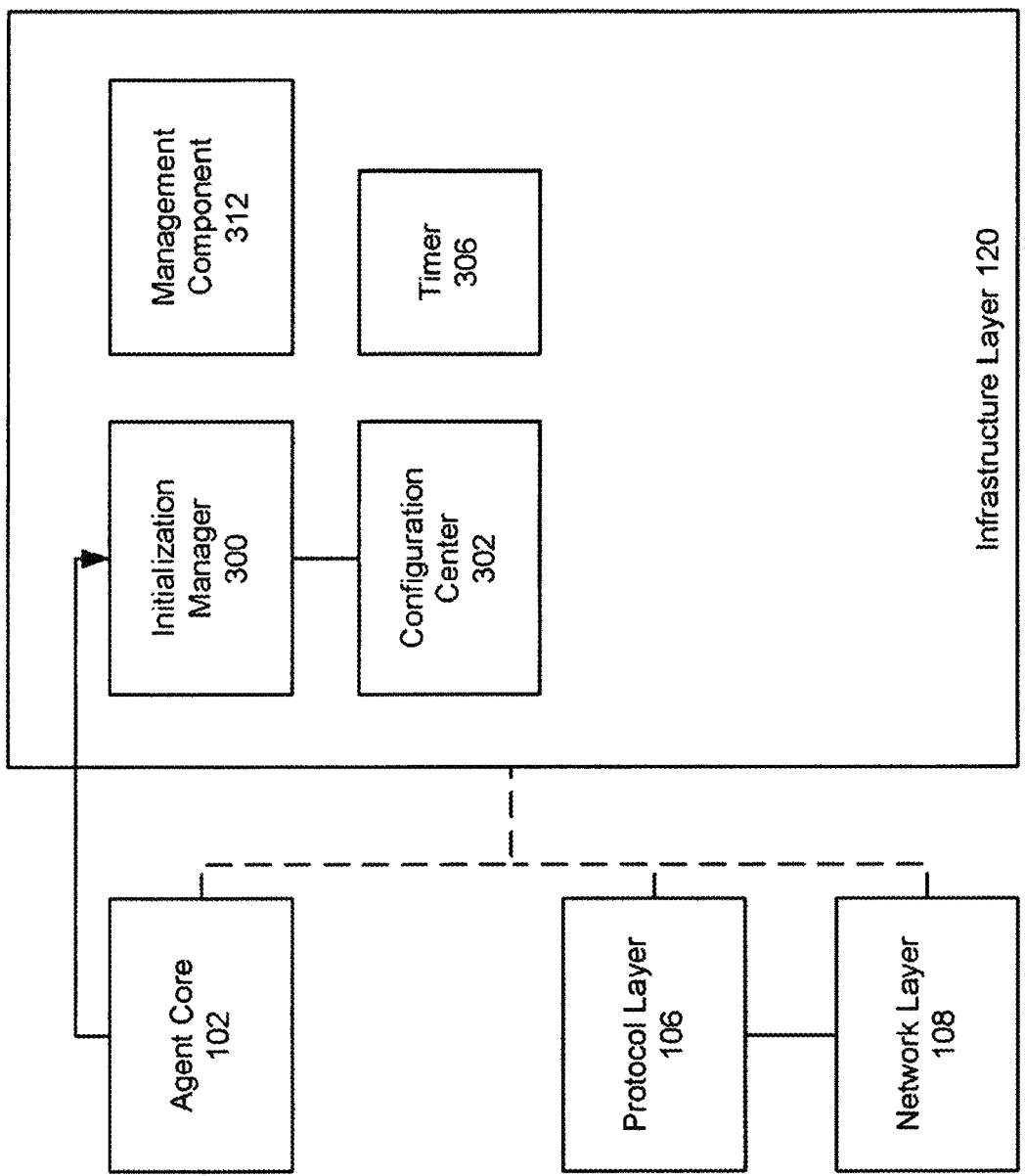
FIG. 3A shows the infrastructure layer of FIG. 1 in more detail in an exemplary configuration according to the present invention.

Security is preferably handled also by the infrastructure layer (see FIG. 3A). Security manager 238 preferably features a security mechanism that may optionally include XACML, SSL or other alternatives. One or more different types of key encryption and/or authentication mechanisms may also optionally be used.

According to another optional but preferred embodiment of the present invention, façade 104 features a number of different functions, some non-limiting, illustrative examples of which are listed in Appendix B.

FIG. 3A shows infrastructure layer 120 of FIG. 1 in more detail in an exemplary configuration according to the present invention. As shown, infrastructure layer 120 preferably features an initialization manager 300. Initialization manager 300 is preferably responsible for the initialization process of the agent. When the agent is first started, initialization manager 300 preferably performs the following tasks:
a. Initialize the logger module
b. Initialize the configuration module
c. Create a core component (the agent's infrastructure hub)
d. Set the configuration manager of the core component
e. Initialize the core component Initialization of the previously described map (see FIG. 2) may optionally be performed with a static configuration file. Addresses in the map may optionally be structured as address@domain (I.e. A1@D1, A3@D9 . . . ).

During initialization, the agent preferably sends a message telling "the world" (agents belonging to its group) that it is the publisher of some message template(s). Some of the templates may optionally be predefined; these templates are preferably persistent. The agent preferably loads these templates from the persistent store and sends/resends (if the initialization process is performed after a failure, for example) them upon initialization.

At initialization, the agent preferably sends a subscribe message to other agent(s) in the world, thereby requesting that the publishing agent subscribe the requesting agent to the messages being published by the publisher.

The information received upon initialization may optionally be configured as follows:
a. Message Template A=Client A, Client B, Client C
b. Message Template B=Client B, Client C, Client E At least during the initialization process, and preferably after as well, as described in greater detail above, the agent is preferably able to subscribe to topics. Subscribing to topics is done by sending a "who is the publisher of the topic X" message using "domain multicast" and/or broadcast to all the agents in the network. A relevant publisher agent may reply to the agent with a confirmation; thus the requesting agent will be able to subscribe to the new topic with the publisher.

This topic discovery flow preferably enables the agent (as a side effect) to rediscover publishers (agents), because publishers responses to "who is the publisher of the topic X" message, every publisher (agent) which the requesting agent does not know will be added to the requesting agent's world map.

If initialization occurs after a failure, once the agent recovers from the failure, it preferably sends a subscribe message to the world (as known to the agent); this message preferably causes other agents to update their world map with the new agent if they don't know it already.

The agent can also optionally send a message telling the world that it is the publisher of some message templates.

During the agent's initialization all persistent messages which were not sent are preferably resent.

According to other preferred embodiments of the present invention, initialization manager 300 is called from the agent core (not shown; see FIG. 2), which passes two parameters: a init file location and a loader object.

The initialization process preferably has a plurality of parts: initialization from a init file step; and the loader step. Given an init file (property file) the system preferably loads all the classes listed in the property file (keys) by invoking the given initialization method (values).

A non-limiting illustrative, example of an init file entry is as follows: # Remark regarding this entry com.coridan.core.cm.ConfigurationManager=initInstanse( ).

In this example, initialization manager 300 calls the initInstanse( ) method of the ConfigurationManager singleton (located at configuration center 302, described in greater detail below).

All singletons preferably implement getInstance( ) and be registered as entries in the init file.

The loader process is preferably performed as follows: given a Loader object, initialization manager 300 then delegates the next stages of the load to this loader. A simple loader will perform the init process for all the relevant infrastructure elements; specific components according to the present invention (clients, servers . . . ) will preferably have their own loader that will either inherit from this simple loader or implement a loader interface (in order to disable some infrastructure components).

Configuration center 302 preferably is a repository of key and values. Configuration files are preferably held in property files. All common properties are preferably held in the repository file as repository parameters. Configuration center 302 is preferably called upon initialization by the agent core (see above for a description) and given a component specific configuration file name as parameter (e.g. client.param). The component specific configuration file is preferably able to over-write and/or append to the common configuration.

Configuration center 302 preferably then merges the two files into one property map and a set of methods, which are more preferably accessible to a client that needs the configuration data.

Examples of such methods include but are not limited to:
ConfigCenter center=CoreComponent.getConfigCenter( )
Boolean presistentEnabled=center.getBooleanValue("persistent_enabled")

Figure 4:
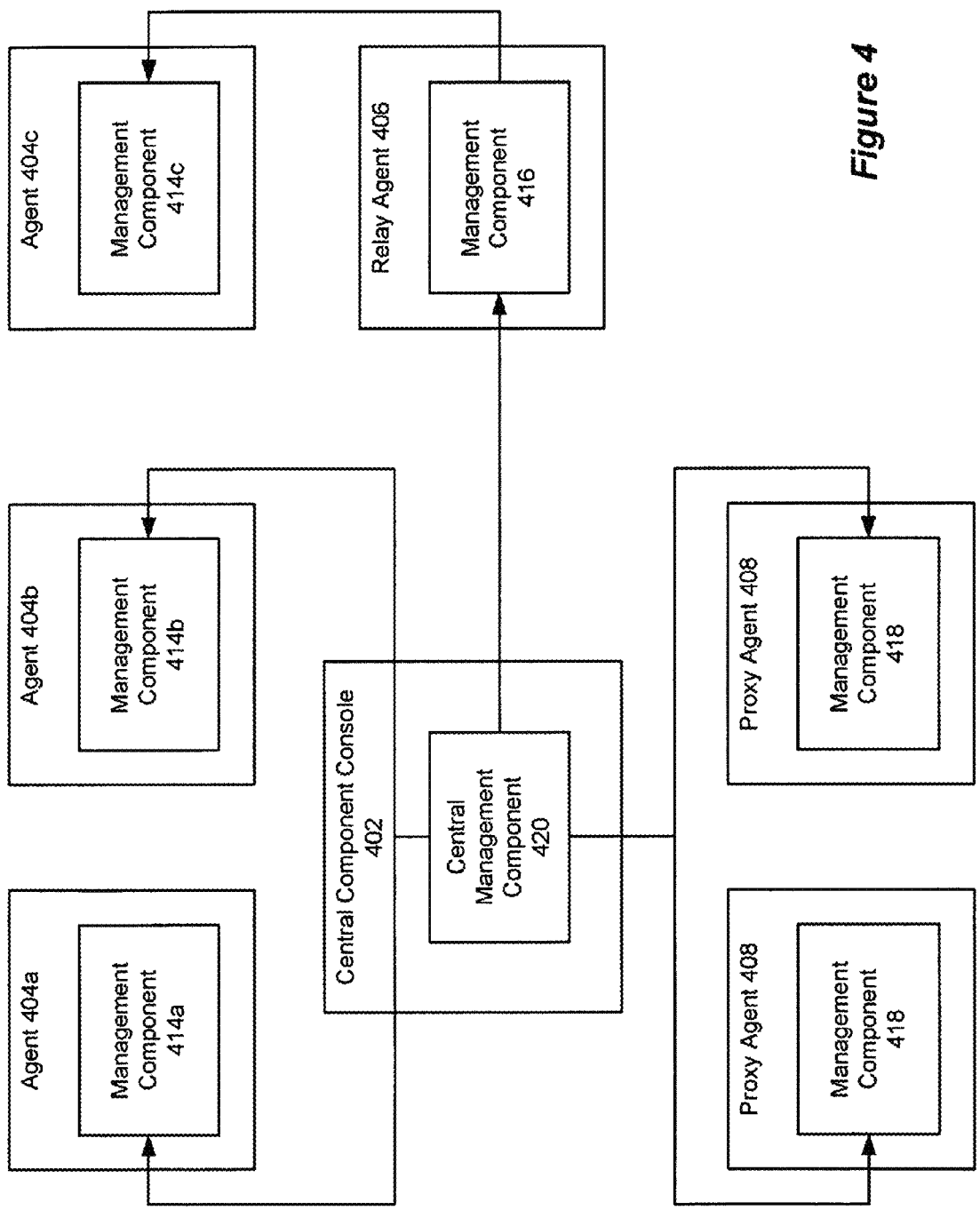
FIG. 4 shows an exemplary system according to the present invention with a central management console and a plurality of agents.

Properties can optionally be changed at runtime by the Management Component (MC; not shown, see FIG. 4). Persistency is preferably controlled by configuration center 302. Objects may optionally be notified of changed properties, optionally and preferably by performing the following two processes:

a. implement Refreshable interface (method refresh)
b. register themselves to the configuration center (register-RefreshableObject(this))

When changes accrue, configuration center 302 invokes the refresh method in the objects and they refresh themselves with the new data.

According to preferred embodiments of the present invention, each component of the system of the present invention has a management component, as for configuration center 302 above. The management center enables the component (such as an agent for example) to be controlled and/or managed from a remote location.

The management center receives the management XML commands passed from the network layer, described in greater detail below, and invokes the relevant command in its command repository with the XML parameters. The management center replies with an XML response, which may be an ACK or a relevant data for that request for example.

The management center preferably examines each added object, and if the object implements a well defined naming structure, the management center is preferably able to link a XML management command to a method.

According to other preferred embodiments of the present invention, the management center has a security mechanism, which may optionally be implemented as follows. Each client connecting to the management center has a role. The management center preferably holds the commands in the repository in a way that will enable a client to see and invoke only the methods relevant to that client or to sub roles on the client's role.

A non-limiting illustrative example is as follows:
a. An agent administrator is preferably able to see and invoke the commands and the commands of an agent's viewer but not the commands of a domain administrator.
b. A command for the management center is preferably received from a management component console (MCC), as described in greater detail below with regard to FIG. 4.

Network layer 310 preferably handles low-level network operations, i.e. creating and accepting sockets, and reading and writing message buffers from sockets. It also includes a decision process for finding the least expensive way to send a message to one or more destinations.

Network layer 310 interfaces with protocol layer 308. When data is available on one of the sockets that network layer 310 manages, it reads the incoming message into a message buffer, and passes it to protocol layer 308.

For outgoing messages, network layer 310 expects to receive a list of destinations (agents for which the message is intended) and a message buffer. This buffer is a byte array containing an already serialized message.

One important role of network layer 310 is the transport decision process. A transport is the combination of a network socket and a transport protocol. The protocol provides services such as reliability, message integrity, etc. Transports can be unicast, meaning a message sent will be received by one agent only (example: a TCP socket), although this may optionally be performed multiple times for multiple agents, or multicast, meaning a message will be received by more than one agent, and possibly all agents (example: a multicast socket with LRMP (lightweight reliable multicast protocol) as a transport protocol).

Each transport has two costs associated with it, a setup cost and a message cost. The former quantifies how expensive it is to setup this transport—creating a socket, initializing the protocol stack, sending any initialization messages defined by the transport protocol. The latter describes the cost of sending a message via the transport. A message cost can be a constant, or a function. For example, when sending a message through a multicast transport, each recipient which is not a destination would add to the total message cost. A cost function describing this desired behavior can be defined.

An outgoing message includes one or more destinations. It possible for an agent to have several transports leading to it. The responsibility of network layer 310 is to find, for each outgoing message, the optimal destination(s) to be used cost-wise. This defines the transport decision process.

Another aspect of the transport process is to determine the cost at least partially according to the route for the message, for example according to routing tables. Also, one aspect of the transport process is to determine whether a particular connection that is open to another agent should be closed, although this decision preferably also considers the cost of reopening the connection should this be necessary, and more preferably also considers the likelihood of reopening such a connection.

Another parameter of a transport is whether or not it is encrypted. Protocol layer 308 can request that a message be sent using encrypted transports if available. In this case, the encryption capabilities of a transport preferably take precedence over its cost in the transport decision process.

Timer 306 preferably is responsible for keeping the current time updated. Different modules in the agent are preferably able to query the system's current time by querying timer 306.

Timer 306 preferably is created to alleviate system resources consumed by each call to System.getCurrentTimemills( ). The time resolution of timer 306 preferably is 1 second, meaning that the internal time of the timer is updated every second.

Infrastructure layer 120 preferably also includes a management component 312 for handling communication between the console (not shown; see FIG. 4) and the agent.

Figure 3B:
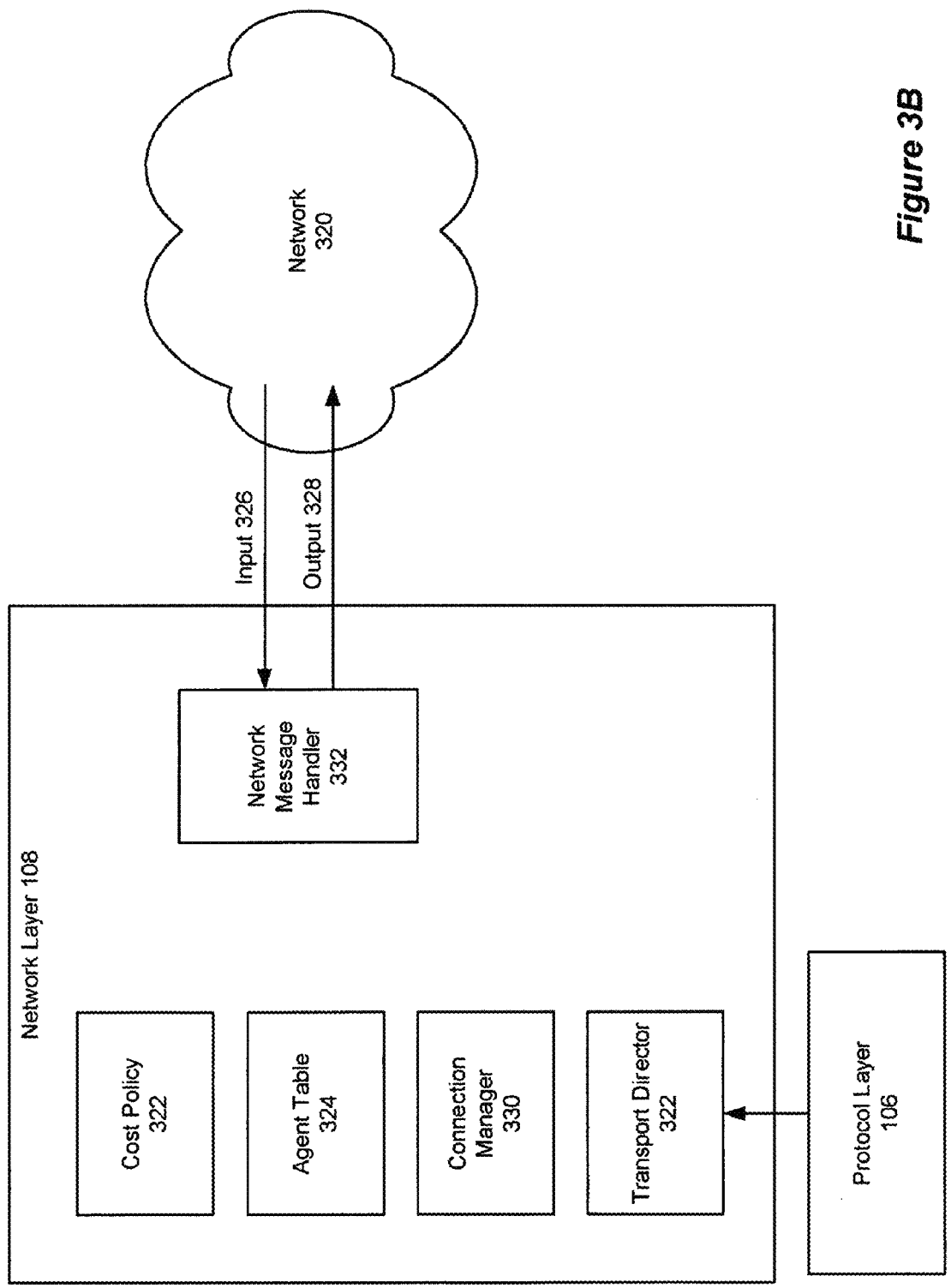
FIG. 3B shows an exemplary network layer according to the present invention.

FIG. 3B shows an exemplary structure of network layer 310 from FIG. 3A.

Network layer 310 is preferably able to handle message transmission and reception from a network 320, such that the agent does not need to be aware of the type of network and/or network protocols being used. Network layer 310 also preferably determines how to send a message and also preferably determines and/or selects a mechanism for sending a particular message, such as by uni-cast, multi-cast or reliable multi-cast, broadcast, TCP, UDP and/or reliable UDP. The mechanism is more preferably selected according to at least one of a cost function, availability of the mechanism and scale of the mechanism relative to the data to be transmitted (optionally the cost mechanism could include the latter two factors in its function).

Network layer 310 preferably includes a number of data structures. For example, one such network structure is preferably a cost policy 322. This is a global object specifying the cost of using the various transports available in the system. The policy specifies the setup cost, and the message cost for each transport type available. The setup cost describes how expensive it is to setup a connection, and the message cost describes the cost of sending a message using a connection.

Another such object is an Agent Table 324. Each record preferably includes:
a. Agent address (key)
b. Transport list:
  1. Transport type (multicast, TCP, HTTP tunnel, etc.)
  2. Transport details (IP address, port)
  3. Transport setup cost (how expensive is to setup this connection)

4. Transport message cost (how expensive is it to send a message using this connection
c. Send/Receive object (args: socket, buffer). This is where the transport protocol stacks reside (e.g. LRMP, HTTP Tunnel)
d. Connection, if available.
e. Socket
f. Last time used
g. Statistics The record may optionally also be changed, for example upon receipt of new information.

Network layer 310 also preferably has one or more Inputs 326 and Outputs 328. For example, inputs 326 may optionally include but are not limited to one or more of the following: Incoming message—through a network connection; Outgoing message—through the protocol layer.

Inputs 326 are also preferably subject to configuration, as previously described, for example according to a cost policy, max number of connections, connection age timeout, and so forth.

Outputs 328 may optionally include but are not limited to one or more of the following for example: Incoming message—to the protocol layer; Outgoing message—to the network connections; Error Callback—when an outgoing message sending fails, this is used to report the problem to the protocol layer.

Network layer 320 also preferably includes a connection manager 330, which is responsible for creating new connections, and sending messages through these connections. Connection manager 330 receives a buffer containing the message, and a list of addresses to which to send the message. If an address does not have a connection associated with it yet, this connection is created at this stage.

The layer can optionally be configured to maintain a maximum number of connections. It also preferably removes connections (sockets) if they were not used for a period of time which is more preferably determinable. If the decision is based on the number of connections, the unused connection(s) are preferably removed using the LRU (Least Recently Used) algorithm, such that the connection or connections being least recently used or accessed by network layer 310 are removed.

If the manager encounters a problem when sending a message, it optionally and preferably uses a callback supplied by protocol layer 308 (see FIG. 3A) to report the problem.

The network message handler 332 preferably listens to all available connections. When a message arrives, it is read into a buffer, and passed to protocol layer 308 (see FIG. 3A).

Transport director 334 is preferably activated by protocol layer 308. It receives a buffer, and a list of addresses. The responsibility of transport director 334 is determining the cheapest way to send this message to the requested destinations, according to the costs defined for each transport.

Transport director 334 preferably locates the "cheapest route" to send the message. The decisions taken by transport director 334 are preferably managed by a pluggable "dispatching policy".

A sample policy may optionally be implemented according to the following non-limiting example:
a. If the number of recipients is small, preferably according to a configurable threshold, the message should be sent by unicast.
b. If the number of recipients is larger than the threshold, the message should be sent by multicast.

Transport director 334 preferably has knowledge of the transmission channels that are available to the agent according to the dispatching policy, including but not limited to, multicast, broadcast, reliable multicast, UDP, RUDP, TCP, HTTP Tunnel, or SSL. Transport director 334 is preferably able to understand the message recipients and their respective capabilities, optionally also according to security considerations, and to make an informed decision on how to send the message to them.

For example, transport director 334 looks at the targets, and sees if all of them can receive multicast. If "n−2" can receive multicast, then transport director 334 sends the message using multicast to the "n−2" receivers and sends the message by using TCP or some other protocol to the receiver(s) which could not handle the multicast message.

The agent's capabilities include which services are connected to the agent and which adaptors are attached to it. The agent's information about other agents includes other agents' networking capabilities (transport capabilities). During the connection establishment process between two agents the connecting agents will make sure their respective information about the other agents transport capabilities is complete. They will do so by swapping UPDATE_TRANSPORT_CAPABILITES messages.

Transport director 334 passes a buffer and a list of transports to connection manager 330.

FIG. 4 shows an exemplary system according to the present invention with a central management console according to the present invention and a plurality of agents. As shown, a system 400 features a central management console 402 and a plurality of agents, shown as a plurality of regular or peer agents 404, which are described in greater detail with regard to the previous Figures; a plurality of relay agents 406, which transmit information between agents 404 and/or between central management console 402 and an agent 404 as shown, for example because of lack of a direct connection; and a plurality of proxy agents 408, which assist an agent 404 with load management and/or processing. Each of these different types of the above agents preferably has a management component 410 as described above.

Central management console 402 preferably forms the central point of management in the network according to the present invention, which preferably enables human administrator(s) to view the network and invoke commands on each component thereof.

Central management console 402 is preferably operated by a Web server in order to be able to provide a user interface in the form of Web pages; more preferably, central management console 402 also (additionally or alternatively) supports other interfaces (like JMX).

Central management console 402 is preferably able to connect to each management component 410 as shown for example with regard to FIG. 4.

Central management console 402 preferably features a security mechanism. Users (human administrators) are preferably assigned a role upon first interacting with central management console 402. Some users may optionally have the same role but each user preferably has only one role.

Some roles can optionally be permitted to create other user identities and attach a role to them, for example as console administrators. The user identities and their roles are preferably saved to a persistent storage (preferably LDAP (lightweight directory access protocol) server, or database or file). Central management console 402 preferably does not permit a user to access commands that are not related to the user's role.

Central management console 402 preferably also features a central management component 420 for communicating with management component 312 at each agent 100 (see FIG. 3A).

Figure 5:
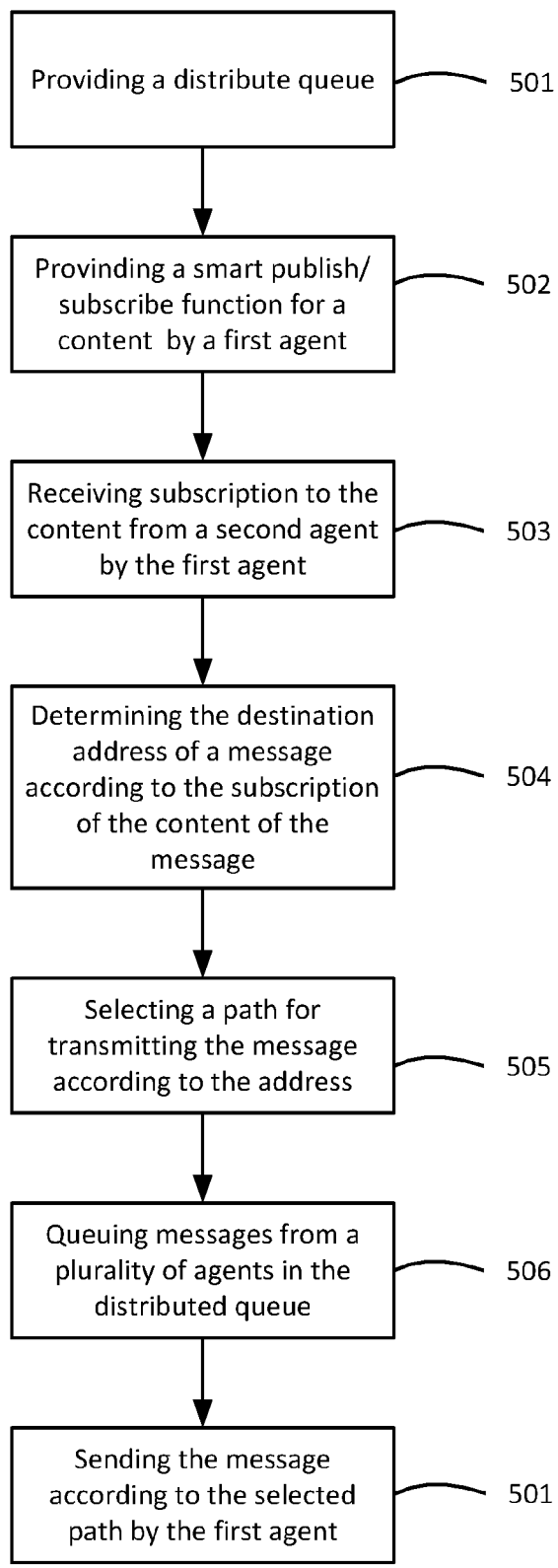
FIG. 5 shows an exemplary flow diagram for distributing a message among a plurality of agents according to the present invention.

FIG. 5 shows an exemplary flow diagram for distributing a message among a plurality of agents according to the present invention.

One embodiment of the present invention is a method for distributing a message among a plurality of agents in a fully distributed system. Such a method can comprise determining an address for the message by an agent 504; selecting a path for transmitting the message according to the address by the agent 505; and sending the message according to said path directly by said agent 507.

In one embodiment of the present invention, the address for distributing a message is determined at least partially according to a content of the message, wherein the agent is capable of parsing the message to determine the content of the message. In one example, the message comprises XML, such that the message can be parsed according to an analysis of at least one XML element. In another case, the message comprises at least one portion, component or element for being parsed by the agent. In yet another example, the message has a protocol comprising at least one of JMS, HTTP, TCP messages, RMI (remote method invocation) or any other suitable type of message protocol.

In one embodiment of the present invention, a second agent subscribes to said content 503, such that the address is determined according to subscribing to the content by the second agent 504.

In another embodiment of the present invention, the selecting of the path further comprises selecting a transport mechanism. In one example, the transport mechanism can be selected from the group consisting of a persistent connection and a temporary transmission. In another example, the connection is selected from the group consisting of reliable UDP (RUDP), UDP and TCP. In yet another example, the transmission is selected from the group consisting of unicast, broadcast, multicast, tunneling and reliable multicast.

In another embodiment of the present invention, the transport mechanism is at least partially selected according to at least one of a cost function, availability of the connection or scale (of the connection and/or transmission(s)).

In another embodiment of the present invention, the method for distributing a message among a plurality of agents can also includes: providing a smart publish/subscribe function for the message by said agent 502; providing a distributed queue 501; and queuing messages from a plurality of agents in said distributed queue 506.

In another embodiment of the present invention, each agent contributes to the distributed queue, while each agent also features a local queue corresponding to the distributed queue.

In another embodiment of the present invention, the method for distributing a message among a plurality of agents can also includes performing automatic discovery by the agent for determining at least one characteristic of at least one other agent. In one example, the at least one other characteristic comprises at least one of a capability, information being published and information being subscribed. In another example, the automatic discovery comprises receiving a map by the agent.

Figure 6A:
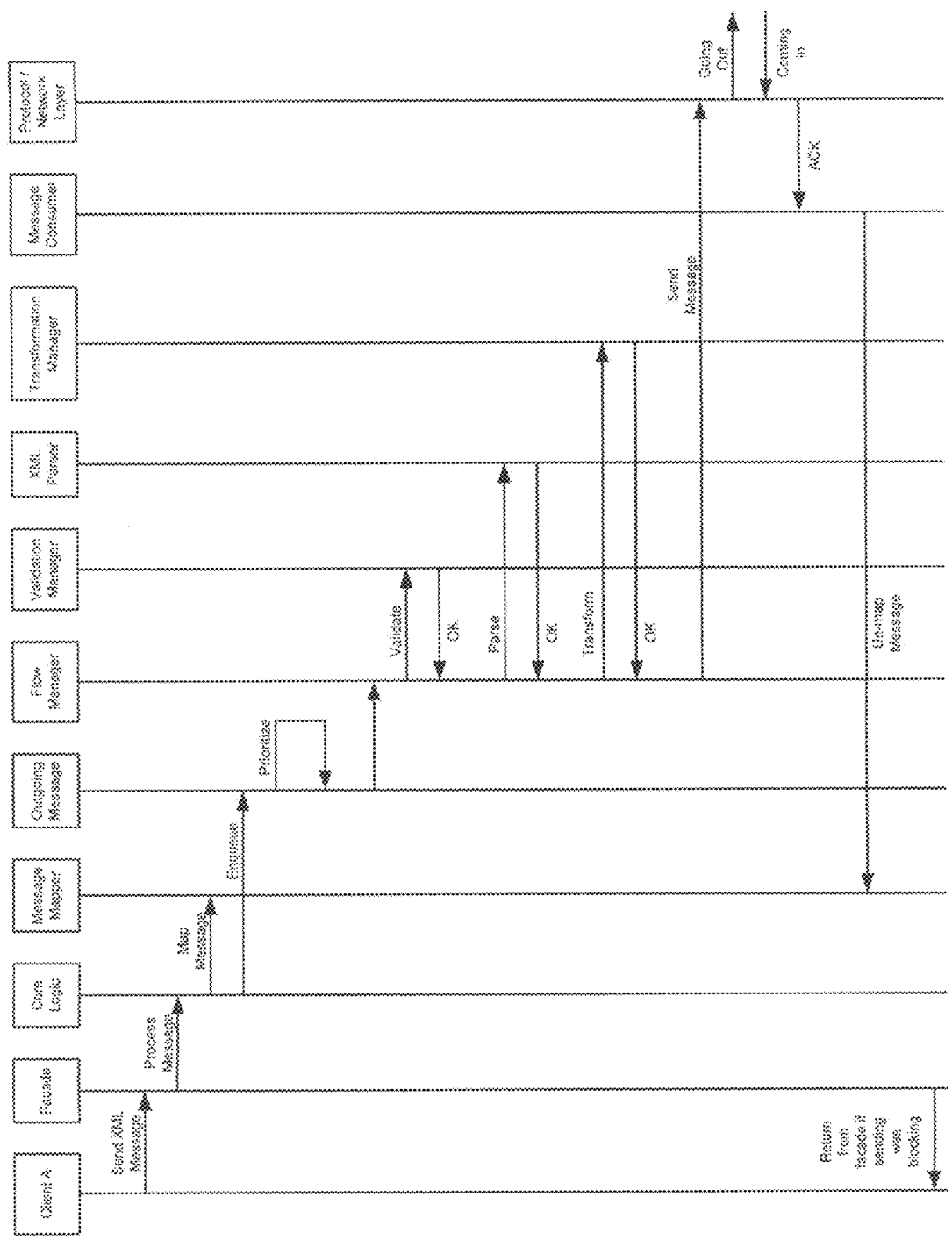
FIG. 6A shows an exemplary flow diagram for sending a message according to the present invention.

FIG. 6A shows an exemplary flow diagram for sending a message according to the present invention. As shown, Client A sends an XML message to a specific address. The process begins with Client A sending an XML message to the agent façade, which processes the message. Next, information is passed to the agent core logic, which further analyzes the message and passes it to the message mapper, which maps the message. The core logic also places the message in the queue at the outgoing message logic, which prioritizes the message within the queue as previously described.

Next, the flow manager performs message handling, such as calling the validation manager to validate the message. The flow manager then calls the XML parser, which parses the message in an exchange with the outgoing message logic. Next, the flow manager calls the transformation manager. The transformation manager transforms the message, after which the flow manager instructs the protocol/network layer to send the message. This layer sends an ACK when the message is sent, after which the message mapper is instructed to remove the message from the map.

Figure 6B:
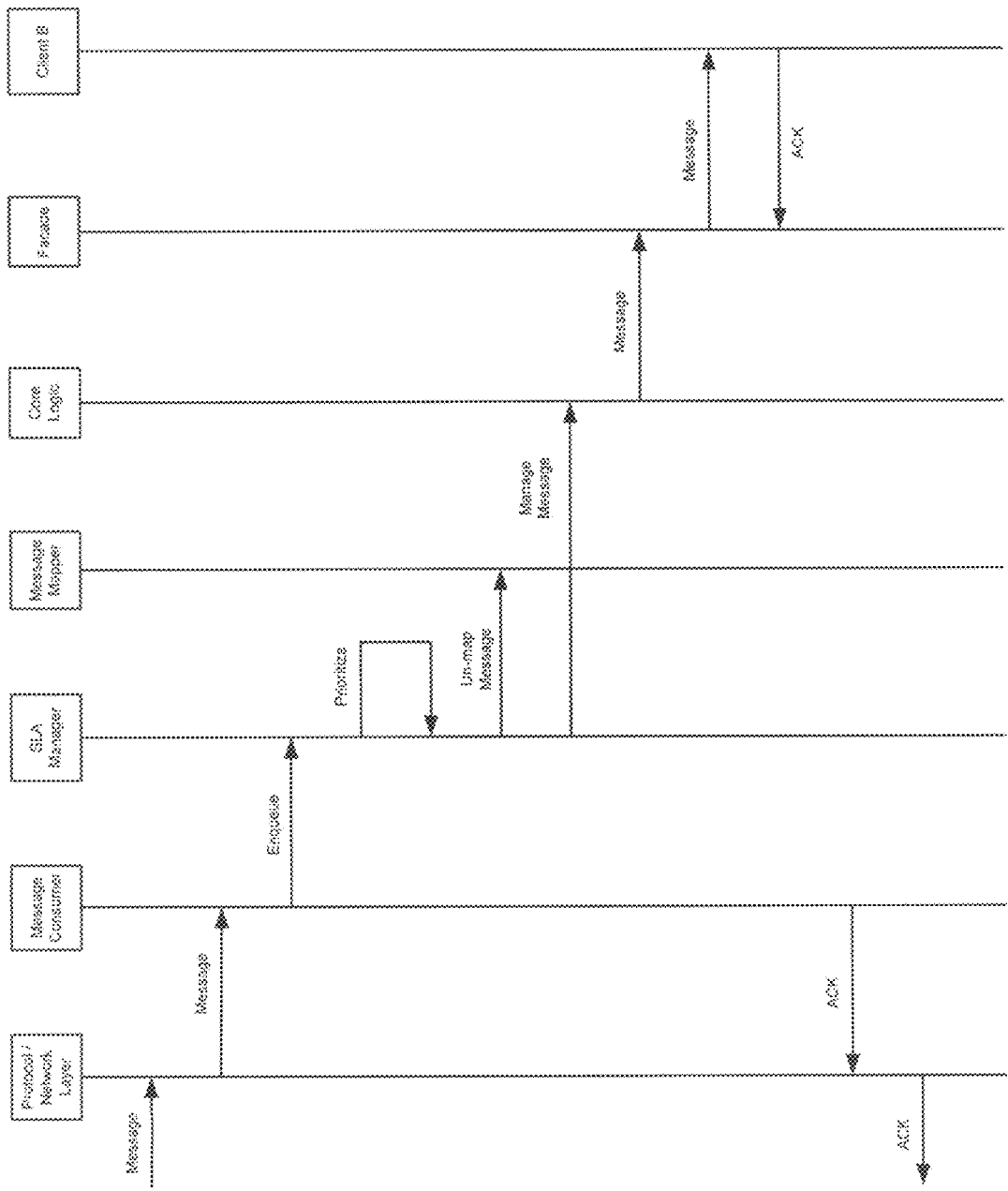
FIG. 6B shows an exemplary flow diagram for receiving a message according to the present invention.

FIG. 6B shows an exemplary flow diagram for receiving a message according to the present invention. As shown, in this exemplary process, Client B receives an XML message. This process now starts with the protocol/network layer receiving the message and passing it to the message consumer, after which the message is placed in a queue at the SLA manager. The SLA manager prioritizes the message within the queue.

The message mapper then receives an "un-map" command, to remove the message from the map. The core logic is instructed to manage the message, for example for analysis, parsing and so forth. The message is then passed through the façade to Client B, which returns an ACK message. The message consumer then returns an ACK message to the protocol/network layer.

Figure 7A:
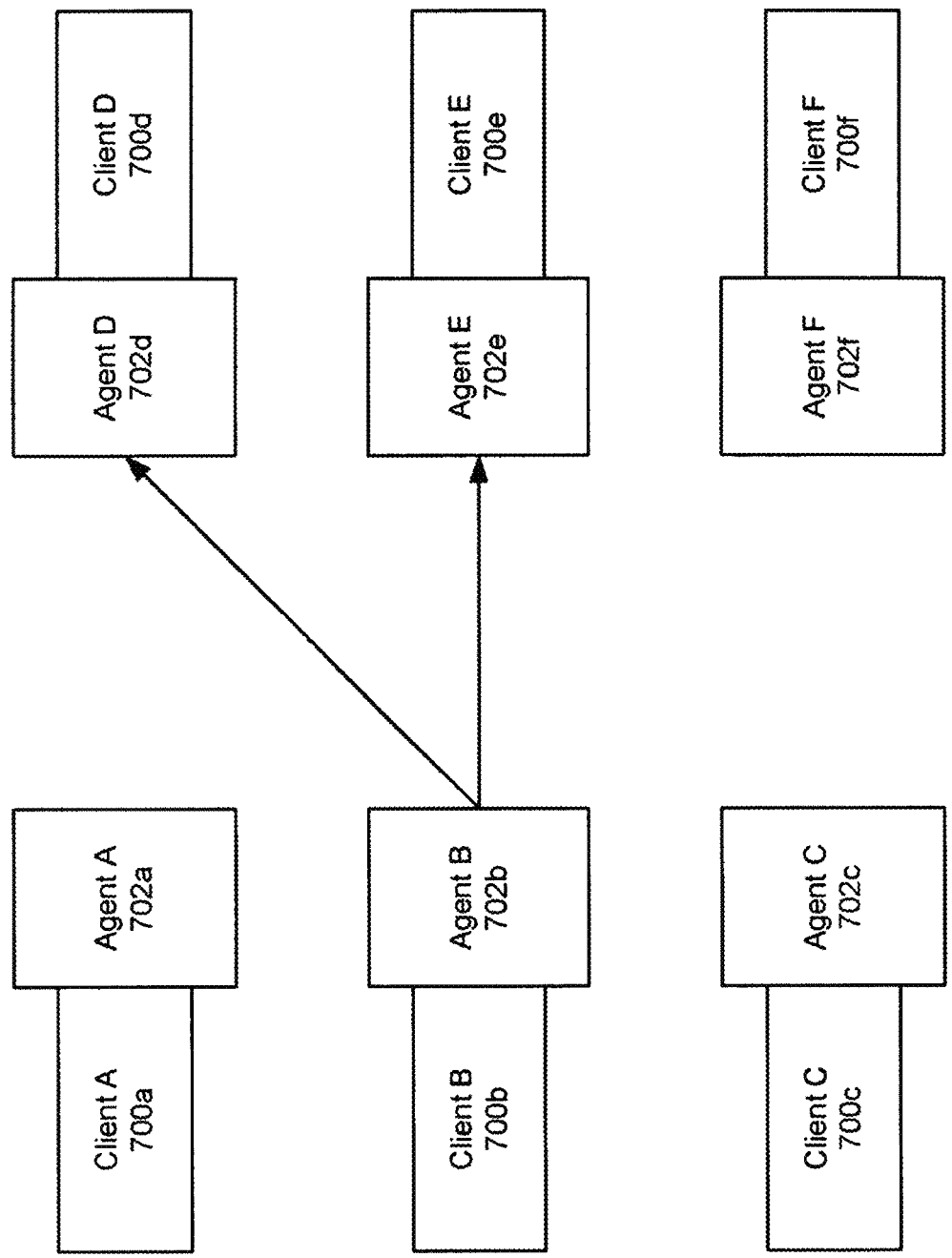
FIG. 7A shows a first illustrative connectivity example of a plurality of agents according to the present invention.
Figure 7B:
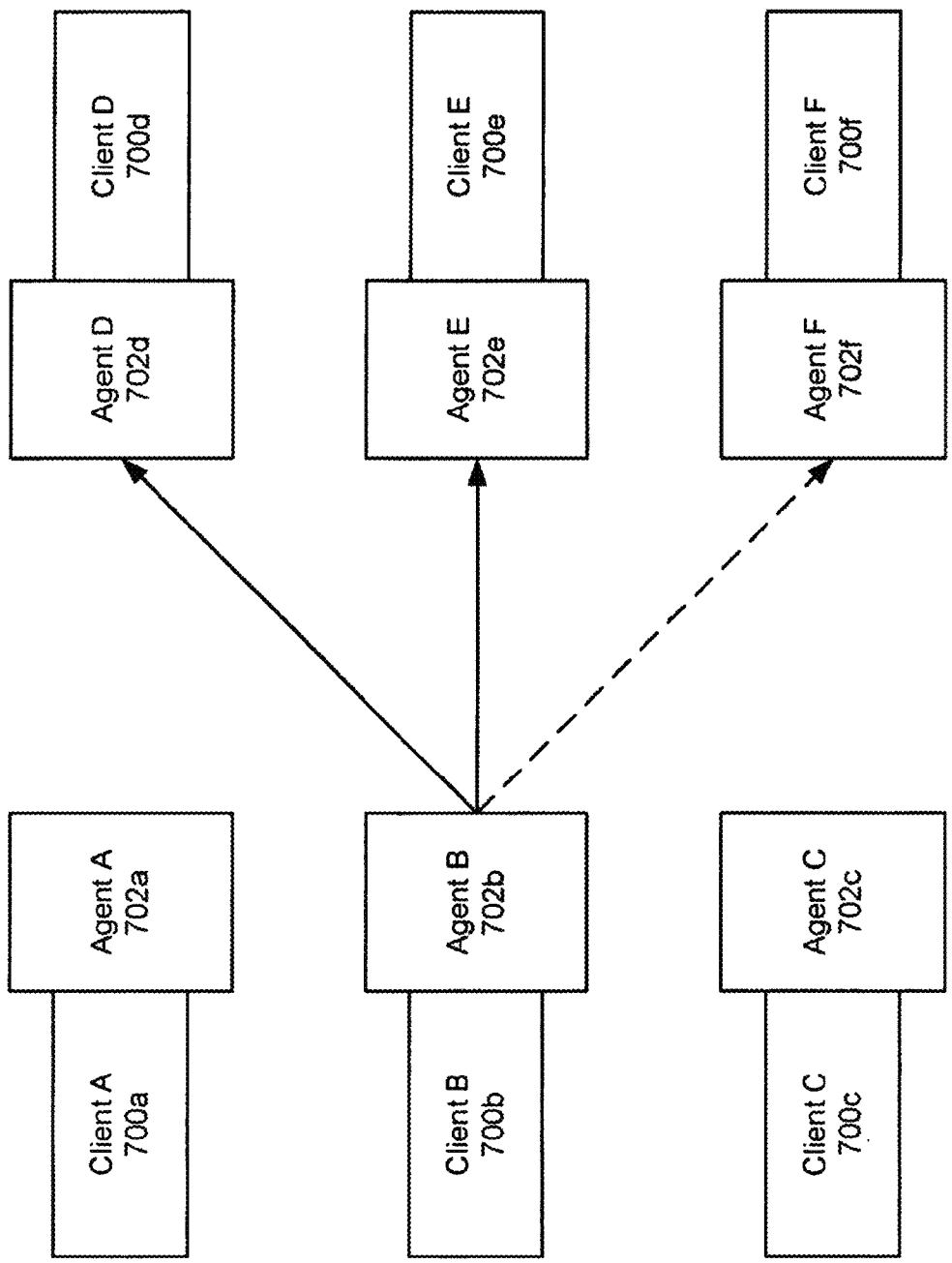
FIG. 7B shows a second illustrative connectivity example of a plurality of agents according to the present invention.

FIG. 7A shows a first illustrative connectivity example of a plurality of agents according to the present invention, while FIG. 7B shows a second illustrative connectivity example of a plurality of agents according to the present invention. These two examples show two different illustrative mechanisms for transmitting messages by an agent, and how the agent may optionally handle such connections. In particular, these examples illustrate the importance of flexible connections, since the agent is preferably not permanently connected to any particular agent, but instead forms connections flexibly, in which also the type of connection is selected according to the requirements of the material being transmitted and/or such factors as the history of previous connections to the particular agent.

In FIG. 7A, each agent 702 has an associated client 700; clients 700 and agents 702 are differentiated by a letter for the purpose of clarity only. Agent B 702 is associated with client B 700, and sends a message to Agent D 702 and Agent E 702. This message may optionally be transmitted by unicast, if this method is the most cost effective, for example if the message is only to be sent to one or two agents 702. Alternatively, if this message is one of many messages to be sent to either or both of Agent D 702 and Agent E 702, there may be a TCP or reliable UDP connection between Agent B 702 and Agent D 702 and/or Agent E 702. The connection between Agent B 702 and each of Agent D 702 and Agent E 702 may optionally be the same or different, depending upon the communication requirements.

Another possibility is that if Agent B 702 needs to send the message to a plurality of agents 702, preferably over a threshold number, then Agent B 702 may optionally use a multicast method, such as a reliable multicast protocol (LRMP). These multicast methods may optionally enable messages to be sent across subnets for example, according to domains or associations of agents 702, rather than according to network structure.

Yet another possibility would be for a broadcast to all agents 702.

FIG. 7B shows an illustrative situation in which Agent B 702 has a stable and/or repeated connection such as TCP or reliable UDP for example, to both Agent D 702 and Agent E 702. If these two connections have now consumed all of the transport resources available to Agent B 702, but Agent B 702 must initiate a connection to Agent F 702, Agent B 702 must decide whether to drop a connection to one of Agent D 702 and Agent E 702, or instead to delay transport to Agent F 702 (and/or to select an alternative transport mechanism). Agent B 702 preferably decides which course of action to perform according to a cost function.

Figure 8A:
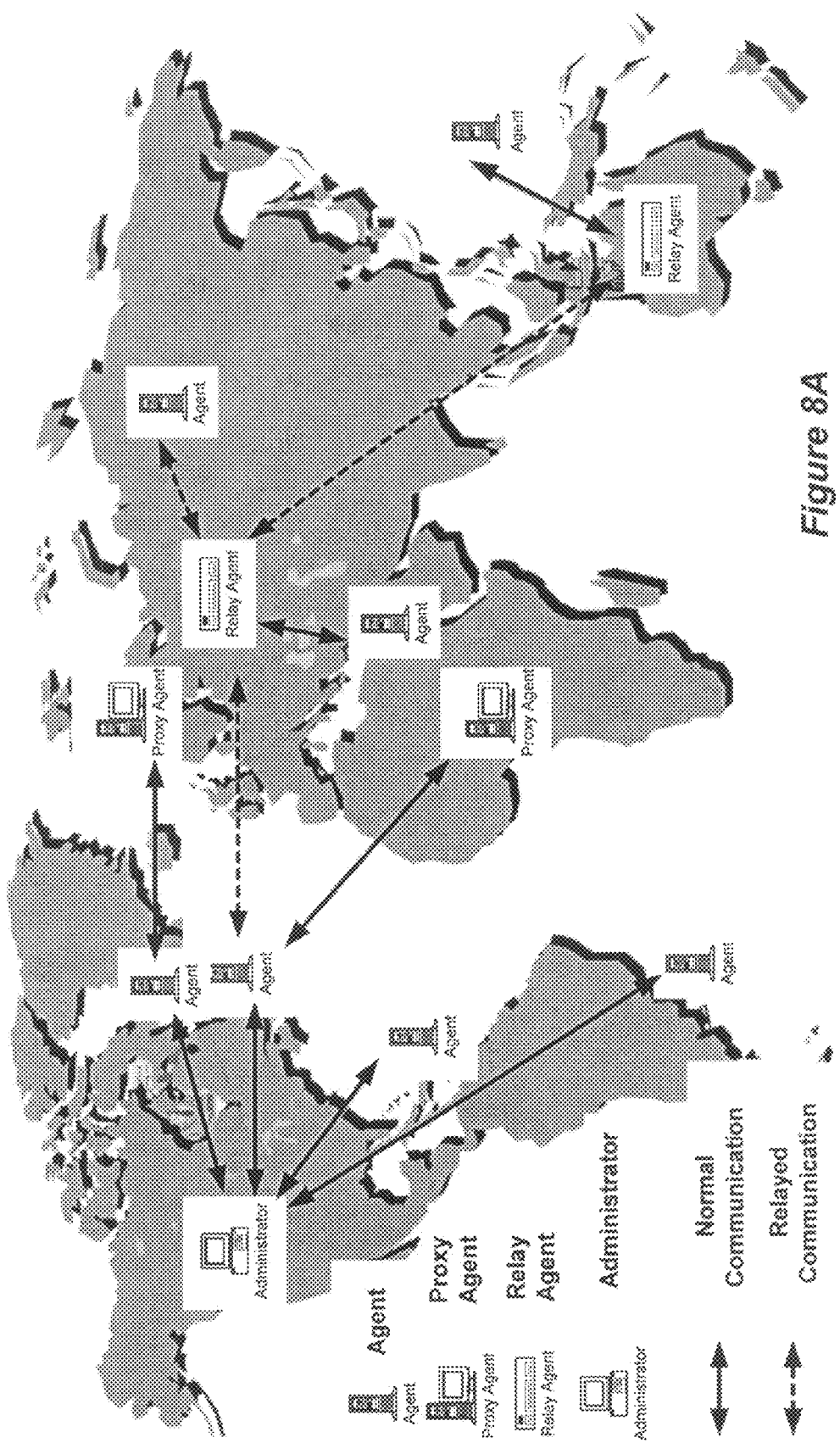
FIG. 8A shows an exemplary system for an optionally (but not necessarily) international network, featuring these different types of agents and normal as well as relayed commands according to the present invention.
Figure 8B:
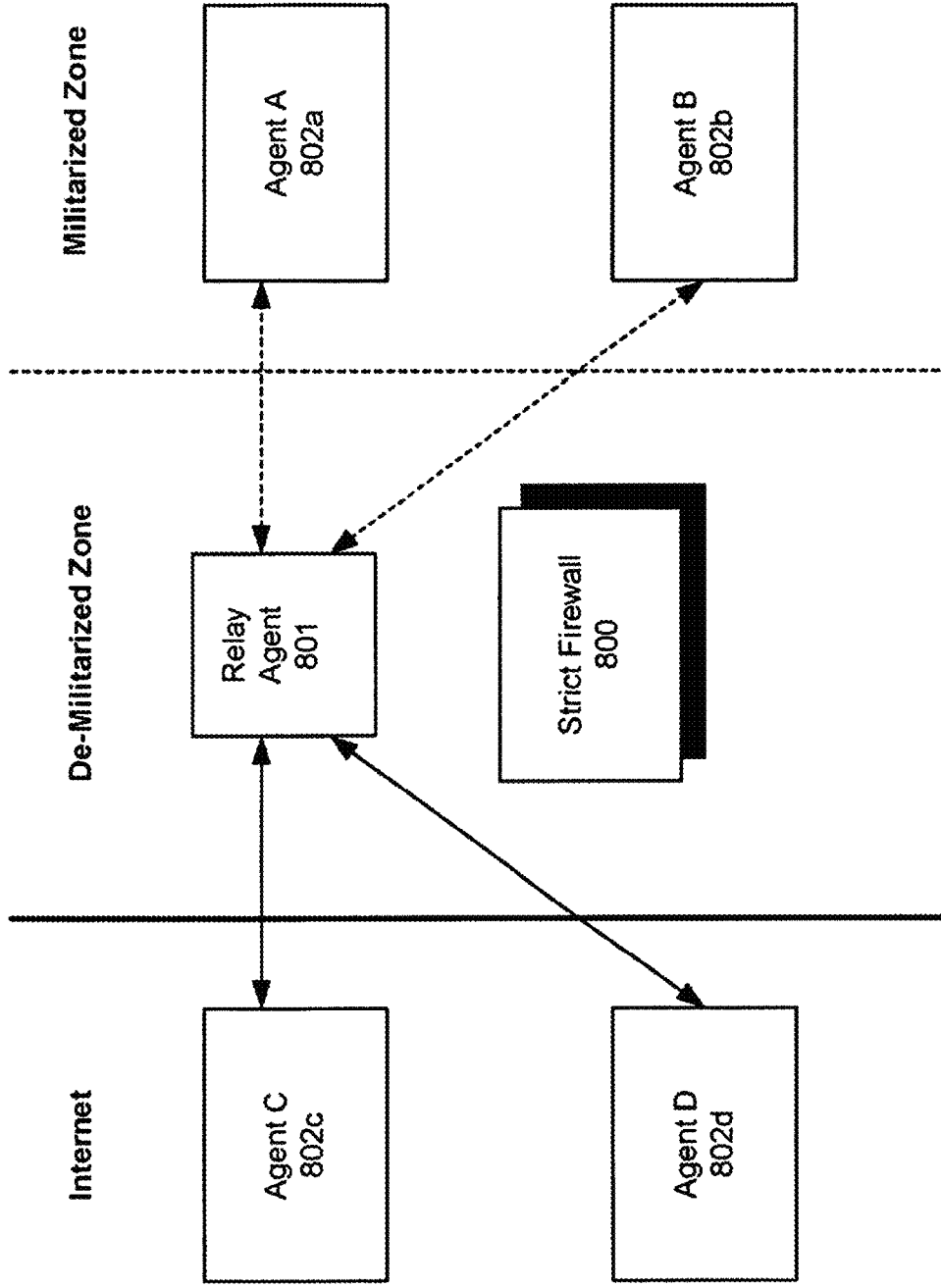
FIG. 8B shows a schematic block diagram of exemplary interactions of an illustrative relay agent in the network according to the present invention with a plurality of different types of agents.
Figure 8C:
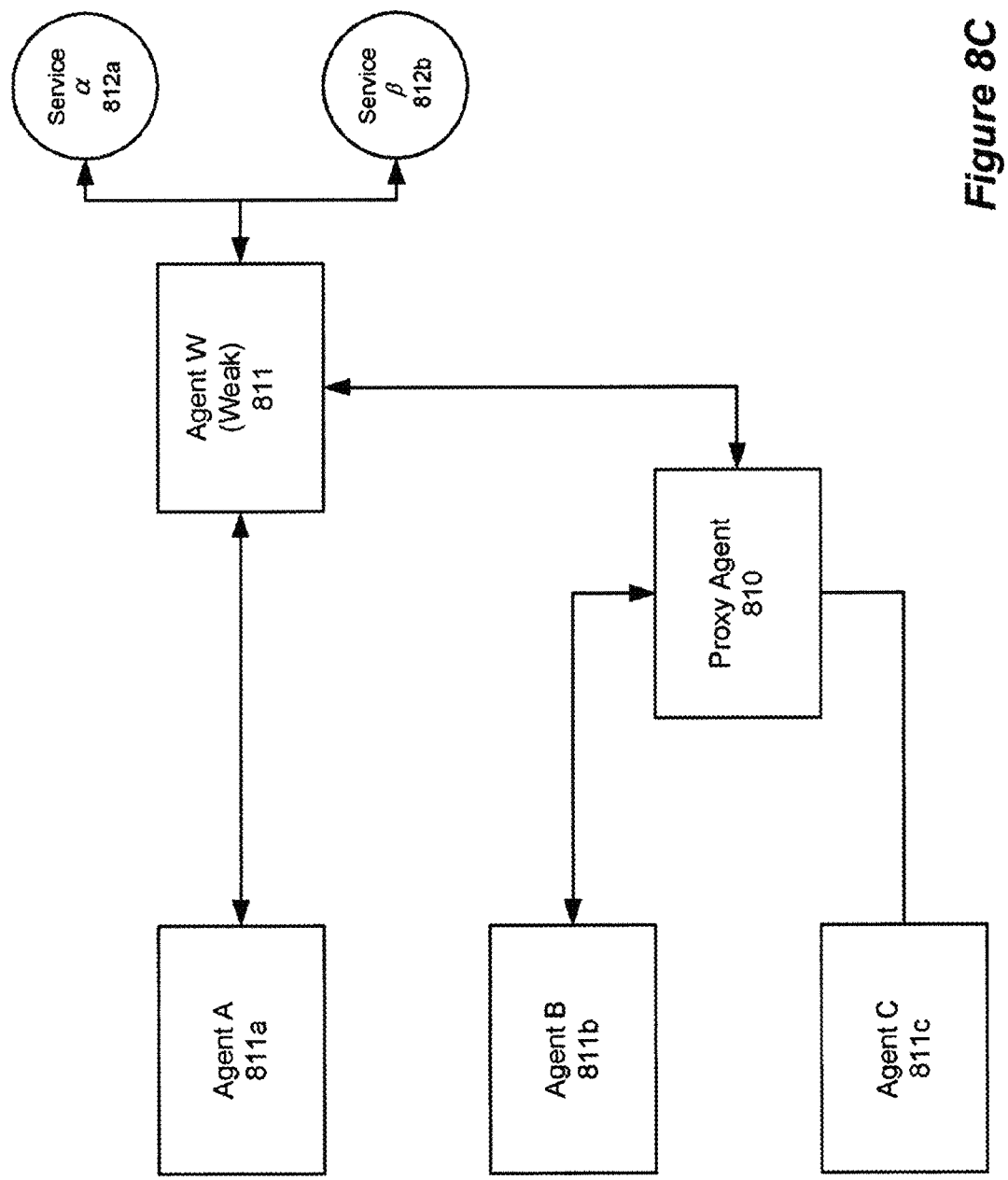
FIG. 8C shows a schematic block diagram of exemplary interactions of an illustrative proxy agent in the network according to the present invention with a plurality of different types of agents.

FIGS. 8A-8C show an overview of an exemplary system according to the present invention with different types of agents. As previously explained and as shown, the system of the present invention preferably includes "normal" or peer agents (shown as "agents" in the Figures); proxy agents; and relay agents.

FIG. 8A shows an exemplary system for an optionally (but not necessarily) international network, featuring these different types of agents and normal as well as relayed commands. A human administrator is shown at a central management console.

Both the proxy agent and the relay agent do not act as "normal" agents rather they serve other agents. Both the proxy agent and the relay agent pass, keep or process messages for other agents in the network, agents that for some reason can not perform or choose not to perform these tasks.

The agent's "world perspective"—its ability to maintain a different view of the world—is one of the main concepts which allow agents to have capabilities such as relying and proxying.

Each agent preferably has two kinds of perspectives:
a. The world perspective; the way other agents perceive the agent.
b. The Agent perspective; the way an agent perceives its own world (network)

Achieving both perspectives is preferably done by manipulating the mapping each agent maintains, thereby making agents believe that other agents resides in different locations in the network.

FIG. 8B shows a schematic block diagram of exemplary interactions of an illustrative relay agent in the network. As stated above relay agents relay messages from one agent to another. Relaying is required when an agent cannot connect directly to another agent. Relaying may be required when one agent is located inside an organization's militarized zone (MZ) while another agent is located on the Internet. Relay agents receive messages which are not addressed to them in order to forward these messages to their proper targets.

Agents C and D (located on the Internet) are unable to reach agents A and B as both agents are located in the MZ (Militarized Zone); in this scenario the Relay agent is able to bypass the firewall as it is located in the DMZ (De-Militarized Zone).

As stated above there are two kinds of perspectives, a world perspective and an agent perspective. When thinking about the relay agent and the sample presented above, one can see that Agents C and D are not able to establish connection with agents A and B (as a firewall separates them both).

In order to solve this problem the network administrator optionally maps agents A and B to the relay Agent.

Thus the world perspective looks like:
a. A (port 80)=>relay (port 80)—meaning when trying to establish connection to agent A (port 80) connect to the relay agent using port 80.
b. B (port 456)=>relay (port 456)—meaning when trying to establish connection to agent B (port 456) connect to the relay agent using port 456.

Both agents C, D maintain the same view of agents sees agents A and B (as they are accessing the internet from inside the MZ).

The relay agent's perspective perceives the world exactly the way is really is, it knows where agent A, B, C and D are located and how to access them.

FIG. 8C shows a schematic block diagram of exemplary interactions of an illustrative proxy agent in the network. Proxy agents help other agents by sharing some of the supported agent's work load. A network administrator may optionally decide to share the load of some agent by adding a new proxy agent to the network and by delegating some of the responsibilities of the agent to the new proxy.

The proxy agent acts as the delegate agent for some service(s). The proxy may be responsible for the parsing of messages or any other activities which the administrator has chosen to assign to the agent.

As shown in FIG. 8C, Agent W exposes two services, Service α and service β. The network administrator may decide to allow agent W to continue exposing service α, and assign service β to the proxy agent thereby sharing the load of agent W.

In cases like this the world perspective regarding the configuration presented above may look like:
a. W (service α)=>W (port 80)—meaning service A exposed by agent W is accessible using port 80.
b. W (service β)=>Proxy (port 5434)—meaning service B originally exposed by agent W is now accessible using the proxy agent and port 5434.

Thus agents are able to see some of the services agent W originally exposed as mapped to agent W and some as mapped to the proxy agent.

The proxy agent perspective will reflect the knowledge that if a request is made to service β is should handle to work by itself (although it may need to consult with agent W).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent and patent application was specifically and individually indicated to be incorporated herein by reference. In addition, citation or identification of any reference in this application shall not be construed as an admission that such reference is available as prior art to the present invention.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

APPENDIX A

Some illustrative examples of measurement objects may include but are not limited to:
a. System.memory.CurrentUsage
  i. Heap space used by the container and its hosted components.
b. System.memory.MaxUsage
  i. Maximum heap space used by the container and its hosted components since last metrics reset.
Per Stage (unit in the agent's logical flow)
a. System.threads.CurrentPoolSize
  i. Size of thread pool used to service transient management tasks.
b. System.threads.CurrentTotal
  i. Total number of threads used by the container and its hosted components.
c. System.threads.MaxPoolSize
  i. Maximum size of thread pool used to service transient management tasks since last metrics reset.

Per Queue
a. Agent.bytes.DurableSize
  i. Total size in bytes of durable subscriptions message store.
b. Agent.bytes.DeliveredPerSecond
  i. Agent wide bytes delivered/sec (includes internal/management messages).
c. Agent.bytes.ReceivedPerSecond
  i. Agent wide bytes received/sec (includes internal/management messages).
d. Agent connections.Count
  i. Agent's connection count.
e. Agent.messages.Delivered
  i. Application messages delivered since start/reset (excludes internal/management messages).
f. Agent. messages. DeliveredPerSecond
  i. Application messages delivered/sec (excludes internal/management messages).
g. Agent.messages.Received
  i. Application messages received since start/reset (excludes internal/management messages).
h. Agent.messages.ReceivedPerSecond
  i. Application messages received/sec (excludes internal/management messages).
Per Connection
a. connection.messages.DeliveredPerSecond
  i. Messages delivered to a connection/sec.
b. connection. messages. ReceivedPerSecond
  i. Messages received by a connection/sec.
Per Queue
a. queue.messages.Count
  i. Number of messages in a queue.
b. Queue.messages.DeliveredPerSecond
  i. Messages delivered to a queue/sec (including rejected messages).
c. Queue.messages.ReceivedPerSecond
  i. Messages received by a queue/sec.
d. queue.messages.Size
  i. Size of messages in a queue.

APPENDIX B

Some illustrative examples of function list in an agent façade may include but are not limited to:
Gets the agent's default delivery mode
a. byte getDeliveryMode( )
Gets an indication of whether message timestamps are disabled
a. boolean getDisableMessageTimestamp( )
Gets the agent's default priority
a. byte getPriority( )
b. byte getAckType( )
Gets the default length of time in milliseconds from its dispatch time that a message should be retained by the message system
a. long getTimeToLive( )
Sets the agent's default delivery mode
a. boolean setDeliveryMode(int deliveryMode, boolean saveChanges)
Sets whether message timestamps are disabled
a. boolean setDisableMessageTimestamp(boolean value, boolean saveChanges)
Sets the agent's default priority
a. boolean setPriority(int defaultPriority, boolean saveChanges)

Sets the default length of time in milliseconds from its dispatch time that a produced message should be retained by the message system
   a. boolean setTimeToLive(long timeToLive, boolean saveChanges)

Receives the next message produced for this agent. The client is blocked for the duration of the method call
   a. CoridanBusMessage receive(String queueName)

Receives the next message that arrives within the specified timeout interval
   a. CoridanBusMessage receive(String queueName, long timeout)

Receives the next message if one is immediately available. Else the client returns immediately
   a. CoridanBusMessage receiveNoWait(String queueName)

Sets a Message Listener, message listeners are called back by the agent's logic upon receiving a message
   a. void setMessageListener(IMessageListener listener, String destination)

Removes a Message Listener from the agent logic. This can be thought of as a unsubscribing to some Template (topic)
   a. void removeMessageListener (IMessageListener listener, String destination)

registers an agent to listen on a remote queue
   a. void registerToQueue(IMessageListener listener, String queueName, long numberOfReceive)

removes this agent from listening to a given remote queue
   a. void unregisterToQueue(IMessageListener listener, String queueName)

publishes the message
   a. void publish(CoridanBusMessage message, String topic)

Publishes a message to the topic, specifying delivery mode, priority, and time to live
   a. void publish(CoridanBusMessage message, String topic, byte deliveryMode, byte priority, byte ackType, long timeToLive)
   b. boolean enqueueMessage(CoridanBusMessage message, String queueName, byte deliveryMode, byte priority, byte ackType, long timeToLive)

Sends a message to an agent
   a. void send(CoridanBusMessage message)

Sends a message to an agent, specifying delivery mode, priority and time to live
   a. void send(CoridanBusMessage message, byte deliveryMode, byte ackType, byte priority, long timeToLive)

Advertises a new service accessible from this Agent
   a. void advertiseService(ServiceActor serviceActor)

What is claimed is:

1. A method for distributing messages among a plurality of agents in a distributed system executing on a machine including one or more microprocessors, the method comprising:
   parsing at least one XML element in a message to determine whether the message includes a particular topic;
   determining, via a first agent, a destination address for the message at least partially according to the particular topic of the message and a second agent that subscribes to the particular topic;
   selecting, via said first agent, a path to transmit the message according to said destination address; and
   sending, via said first agent using a network layer, the message according to said path directly to the second agent;
   wherein the message is sent using a transport selected from a plurality of transports in the distributed system, based on a cost value calculated by a cost function for each of the plurality of transports, wherein the cost value includes a cost for creating a network socket and a cost for initiating a protocol stack for a transport protocol in a transport.

2. The method of claim 1, wherein the transport protocol is selected from a group consisting of a Java Message Service (JMS), Hypertext Transfer Protocol (HTTP), Transmission Control Protocol (TCP) and Remote Method Invocation (RMI).

3. The method of claim 1, wherein said selected transport is from the group consisting of a persistent connection and a temporary transmission.

4. The method of claim 3, wherein said selected transport is based on a connection protocol that is selected from the group consisting of User Datagram Protocol (UDP), Reliable User Datagram Protocol (RUDP), and Transmission Control Protocol (TCP).

5. The method of claim 3, wherein said transmission mechanism is based on a transmission that is selected from the group consisting of unicast, broadcast, multicast, tunneling and reliable multicast.

6. The method of claim 3, wherein said transport is further determined based on availability of connection, and scale of connection and/or transmission(s).

7. The method of claim 1, wherein the distributed system operates without a central message broker.

8. The method of claim 1, further comprising:
   providing, via said first agent, a smart publish/subscribe function for the message.

9. The method of claim 1, further comprising:
   providing a distributed queue that queues messages from a plurality of agents in said distributed queue, including the message from said first agent.

10. The method of claim 9, wherein each of the plurality of agents is associated with a local queue corresponding to said distributed queue.

11. The method of claim 1, further comprising:
   performing, via said first agent, an automatic discovery to determine at least one characteristic of at least one other agent.

12. The method of claim 11, wherein said at least one characteristic comprises at least one of capability, published information and subscribed information of said at least one other agent.

13. The method of claim 11, further comprising:
   receiving, via said first agent, a map for said automatic discovery.

14. The method of claim 1, wherein only said first agent performs message switching.

15. A system for support messaging in a distributed system, comprising:
   one or more microprocessors;
   a plurality of agents in the distributed system that runs on the one or more microprocessors, wherein a first agent in the plurality of agents operates to perform the steps comprising
      parsing at least one XML element in a message to determine whether the message includes a particular topic,
      determining a destination address for the message at least partially according to the particular topic of the message and a second agent that subscribes to the particular topic,
      selecting a path to transmit the message according to said destination address, and
      sending the message according to said path directly to the second agent using a network layer;

wherein the message is sent using a transport selected from a plurality of transports in the distributed system, based on a cost value calculated by a cost function for each of the plurality of transports, wherein the cost value includes a cost for creating a network socket and a cost for initiating a protocol stack for a transport protocol in a transport.

16. The system of claim 15, wherein the selected transport protocol is from a group consisting of a Java Message Service (JMS), Hypertext Transfer Protocol (HTTP), Transmission Control Protocol (TCP) and Remote Method Invocation (RMI).

17. The system of claim 15, wherein the selected transport is based on a connection protocol that is selected from the group consisting of User Datagram Protocol (UDP), Reliable User Datagram Protocol (RUDP), and Transmission Control Protocol (TCP).

18. A machine readable non-transitory storage medium having instructions stored thereon that when executed by a processor cause a system to perform the steps comprising:

parsing at least one XML element in a message to determine whether the message includes a particular topic;

determining a destination address for the message at least partially according to the particular topic of the message and a second agent that subscribes to the particular topic;

selecting, via said first agent, a path to transmit the message according to said destination address; and sending, via said first agent using a network layer, the message according to said path directly to the second agent;

wherein the message is sent using a transport selected from a plurality of transports in the distributed system, based on a cost value calculated by a cost function for each of the plurality of transports, wherein the cost value includes a cost for creating a network socket and a cost for initiating a protocol stack for a transport protocol in a transport.

* * * * *